United States Patent
Izumi et al.

(10) Patent No.: US 11,886,763 B2
(45) Date of Patent: Jan. 30, 2024

(54) IMAGE FORMING APPARATUS, COMPUTER-READABLE STORAGE MEDIUM, AND METHOD FOR ACCEPTING INPUT OPERATIONS FROM MOBILE TERMINAL

(71) Applicant: BROTHER KOGYO KABUSHIKI KAISHA, Nagoya (JP)

(72) Inventors: Koki Izumi, Nagoya (JP); Yuichiro Sakuragi, Ichinomiya (JP); Satoshi Tanimoto, Nagoya (JP); Kosuke Mori, Handa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/184,075

(22) Filed: Mar. 15, 2023

(65) Prior Publication Data

US 2023/0305784 A1 Sep. 28, 2023

(30) Foreign Application Priority Data

Mar. 22, 2022 (JP) .................................. 2022-045348

(51) Int. Cl.
*G06F 3/12* (2006.01)
(52) U.S. Cl.
CPC .......... *G06F 3/1292* (2013.01); *G06F 3/1203* (2013.01); *G06F 3/1236* (2013.01); *G06F 3/1253* (2013.01)
(58) Field of Classification Search
CPC .... G06F 3/1292; G06F 3/1203; G06F 3/1236; G06F 3/1253
See application file for complete search history.

(56) References Cited

U.S. PATENT DOCUMENTS

| 2014/0078549 | A1* | 3/2014 | Amiya ............... H04N 1/00411 358/1.15 |
| 2015/0092229 | A1 | 4/2015 | Miyazaki |
| 2016/0112422 | A1 | 4/2016 | Watanabe |
| 2017/0171401 | A1* | 6/2017 | Kado .................. H04N 1/00212 |
| 2018/0234564 | A1 | 8/2018 | Hirasawa |

FOREIGN PATENT DOCUMENTS

JP 2021073543 A 5/2021

OTHER PUBLICATIONS

Extended European Search Report dated Jul. 7, 2023 from related EP 23 16 1666.5.

* cited by examiner

*Primary Examiner* — Quang N Vo
(74) *Attorney, Agent, or Firm* — Scully, Scott, Murphy & Presser, PC

(57) ABSTRACT

An image forming apparatus includes a network interface, an operation panel including a touch panel, and a controller. The controller is configured to provide a mobile input function to a mobile terminal via the network interface. In response to accepting a first operation to the operation panel with a local operation screen not displayed on the touch panel, the controller causes the touch panel to display the local operation screen, and thereafter switches the local operation screen on the touch panel to a standby screen after waiting until a continuous time with no operation to the touch panel exceeds a first threshold time. In response to accepting a second operation to the operation panel with the local operation screen not displayed on the touch panel, the controller causes the touch panel to display the standby screen without waiting for the first threshold time to elapse.

27 Claims, 20 Drawing Sheets

IMAGE FORMING APPARATUS, COMPUTER-READABLE STORAGE MEDIUM, AND METHOD FOR ACCEPTING INPUT OPERATIONS FROM MOBILE TERMINAL

REFERENCE TO RELATED APPLICATIONS

This application claims priority from Japanese Patent Application No. 2022-045348 filed on Mar. 22, 2022. The entire content of the priority application is incorporated herein by reference.

BACKGROUND ART

Technologies have been known in which an image forming apparatus is configured to perform image formation such as printing and image scanning and to accept various input operations via an operation panel. For instance, a function execution apparatus has been disclosed that has a print engine, an image scanner, and an operation panel including hardware keys and a touch panel. The function execution apparatus is configured to accept input operations to the hardware keys and accept input operations to icons and/or buttons displayed on the touch panel.

DESCRIPTION

In recent years, an increasing number of users have become reluctant to perform input operations to an operation panel that may have been touched by an unspecified number of people, and there is a growing demand for allowing the users to perform input operations to an image forming apparatus without touching the operation panel. Therefore, it is considered to add, to the image forming apparatus, a function for temporarily allowing users to perform input operations from a mobile terminal. On the other hand, however, there are users who are accustomed to performing input operations from the operation panel and therefore wish to perform such operations. Since no technology has been disclosed that allows the users to perform input operations without touching the operation panel, there is room for improvement.

According to aspects of the present disclosure, an image forming apparatus is provided, which includes a network interface, an operation panel including a touch panel, and a controller. The controller is configured to start providing a mobile input function of the image forming apparatus to a mobile terminal via the network interface in response to receiving access required to start providing the mobile input function from the mobile terminal via the network interface in a state where the mobile input function is not provided. The mobile input function enables the image forming apparatus to accept input operations from the mobile terminal via the network interface. The controller is further configured to, after starting to provide the mobile input function, send display data to the mobile terminal via the network interface, thereby causing the mobile terminal to display an operation screen for operating the image forming apparatus from the mobile terminal. The controller is further configured to receive operation data from the mobile terminal via the network interface while the mobile input function is being provided. The operation data indicates what kind of operation has been performed on the operation screen displayed on the mobile terminal. The controller is further configured to perform a corresponding process depending on what kind of operation is indicated by the received operation data. The controller is further configured to set a parameter when the received operation data indicates an operation related to setting of the parameter for image formation by the image forming apparatus. The controller is further configured to perform image formation when the received operation data indicates an operation related to execution of the image formation by the image forming apparatus. The controller is further configured to cause the touch panel to display a local operation screen in the state where the mobile input function is not provided. The controller is further configured to, in response to accepting an operation to the local operation screen, perform a corresponding process depending on what kind of operation has been performed on the local operation screen. The controller is further configured to set a parameter when the accepted operation is an operation related to setting of the parameter for image formation by the image forming apparatus. The controller is further configured to perform image formation when the accepted operation is an operation related to execution of the image formation by the image forming apparatus. The controller is further configured to, in response to accepting a first operation to the operation panel with the local operation screen not displayed on the touch panel, cause the touch panel to display the local operation screen, and thereafter switch the local operation screen displayed on the touch panel to a standby screen for starting to provide the mobile input function, after waiting until a continuous time with no operation to the touch panel exceeds a first threshold time. The controller is further configured to cause the touch panel to display the standby screen regardless of the first threshold time, when one condition is satisfied among a plurality of conditions consisting of a first condition, a second condition, and a third condition. The first condition is that the controller has accepted a second operation to the operation panel with the local operation screen not displayed on the touch panel. The second condition is that in response to receiving, while the mobile input function is being provided, termination data indicating that the mobile terminal has terminated use of the mobile input function, from the mobile terminal, the controller has terminated the provision of the mobile input function. The third condition is that in response to a continuous time with no operation data received from the mobile terminal having exceeded a second threshold time while the mobile input function is being provided, the controller has terminated the provision of the mobile input function.

According to aspects of the present disclosure, further provided is a non-transitory computer-readable storage medium storing computer-readable instructions executable by a processor of an image forming apparatus including a network interface, and an operation panel including a touch panel. The instructions are configured to, when executed by the processor, cause the image forming apparatus to start providing a mobile input function of the image forming apparatus to a mobile terminal via the network interface in response to receiving access required to start providing the mobile input function from the mobile terminal via the network interface in a state where the mobile input function is not provided. The mobile input function enables the image forming apparatus to accept input operations from the mobile terminal via the network interface. The instructions are further configured to, after starting to provide the mobile input function, send display data to the mobile terminal via the network interface, thereby causing the mobile terminal to display an operation screen for operating the image forming apparatus from the mobile terminal. The instructions are further configured to receive operation data from the mobile terminal via the network interface while the mobile input function is being provided. The operation data indicates what kind of operation has been performed on the operation screen displayed on the mobile terminal. The instructions are further configured to perform a corresponding process depending on what kind of operation is indicated by the received operation data. The instructions are further configured to, when executed by the processor, cause the image forming apparatus to set a parameter when the received operation data indicates an operation related to setting of the parameter for image formation by the image forming apparatus. The instructions are further configured to, when executed by the processor, cause the image forming apparatus to perform image formation when the received operation data indicates an operation related to execution of the image formation by the image forming apparatus. The instructions are further configured to cause the touch panel to display a local operation screen in the state where the mobile input function is not provided. The instructions are further configured to, in response to accepting an operation to the local operation screen, perform a corresponding process depending on what kind of operation has been performed on the local operation screen. The instructions are further configured to, when executed by the processor, cause the image forming apparatus to set a parameter when the accepted operation is an operation related to setting of the parameter for image formation by the image forming apparatus. The instructions are further configured to, when executed by the processor, cause the image forming apparatus to perform image formation when the accepted operation is an operation related to execution of the image formation by the image forming apparatus. The instructions are further configured to, in response to accepting a first operation to the operation panel with the local operation screen not displayed on the touch panel, cause the touch panel to display the local operation screen, and thereafter switch the local operation screen displayed on the touch panel to a standby screen for starting to provide the mobile input function, after waiting until a continuous time with no operation to the touch panel exceeds a first threshold time. The instructions are further configured to cause the touch panel to display the standby screen regardless of the first threshold time, when one condition is satisfied among a plurality of conditions consisting of a first condition, a second condition, and a third condition. The first condition is that the controller has accepted a second operation to the operation panel with the local operation screen not displayed on the touch panel. The second condition is that in response to receiving, while the mobile input function is being provided, termination data indicating that the mobile terminal has terminated use of the mobile input function, from the mobile terminal, the controller has terminated the provision of the mobile input function. The third condition is that in response to a continuous time with no operation data received from the mobile terminal having exceeded a second threshold time while the mobile input function is being provided, the controller has terminated the provision of the mobile input function.

According to aspects of the present disclosure, further provided is a method implementable on a controller of an image forming apparatus including a network interface, and an operation panel including a touch panel. The method includes starting to provide a mobile input function of the image forming apparatus to a mobile terminal via the network interface in response to receiving access required to start providing the mobile input function from the mobile terminal via the network interface in a state where the mobile input function is not provided. The mobile input function enables the image forming apparatus to accept input operations from the mobile terminal via the network interface. The method further includes sending, after starting to provide the mobile input function, display data to the mobile terminal via the network interface, thereby causing the mobile terminal to display an operation screen for operating the image forming apparatus from the mobile terminal. The method further includes receiving operation data from the mobile terminal via the network interface while the mobile input function is being provided. The operation data indicates what kind of operation has been performed on the operation screen displayed on the mobile terminal. The method further includes performing a corresponding process depending on what kind of operation is indicated by the received operation data. The method further includes setting a parameter when the received operation data indicates an operation related to setting of the parameter for image formation by the image forming apparatus. The method further includes performing image formation when the received operation data indicates an operation related to execution of the image formation by the image forming apparatus. The method further includes causing the touch panel to display a local operation screen in the state where the mobile input function is not provided. The method further includes performing, in response to accepting an operation to the local operation screen, a corresponding process depending on what kind of operation has been performed on the local operation screen, wherein the corresponding process is setting a parameter when the accepted operation is an operation related to setting of the parameter for image formation by the image forming apparatus. The method further includes performing image formation when the accepted operation is an operation related to execution of the image formation by the image forming apparatus. The method further includes causing, in response to accepting a first operation to the operation panel with the local operation screen not displayed on the touch panel, the touch panel to display the local operation screen, and thereafter switching the local operation screen displayed on the touch panel to a standby screen for starting to provide the mobile input function, after waiting until a continuous time with no operation to the touch panel exceeds a first threshold time. The method further includes causing the touch panel to display the standby screen regardless of the first threshold time, when one condition is satisfied among a plurality of conditions consisting of a first condition, a second condition, and a third condition. The first condition is that a second operation to the operation panel has been accepted when the local operation screen is not displayed on the touch panel. The second condition is that in response to receipt of termination data indicating that the mobile terminal has terminated use of the mobile input function from the mobile terminal while the mobile input function is being provided, the provision of the mobile input function has been terminated. The third condition is that in response to a continuous time with no operation data received from the mobile terminal having exceeded a second threshold time while the mobile input function is being provided, the provision of the mobile input function has been terminated.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, a multi-function peripheral (hereinafter referred to as an "MFP") of a first illustrative embodiment according to aspects of the present disclosure will be described in detail with reference to the accompanying drawings. The first illustrative embodiment discloses an MFP provided with an image processing function and a communication function is disclosed.

Figure 1:
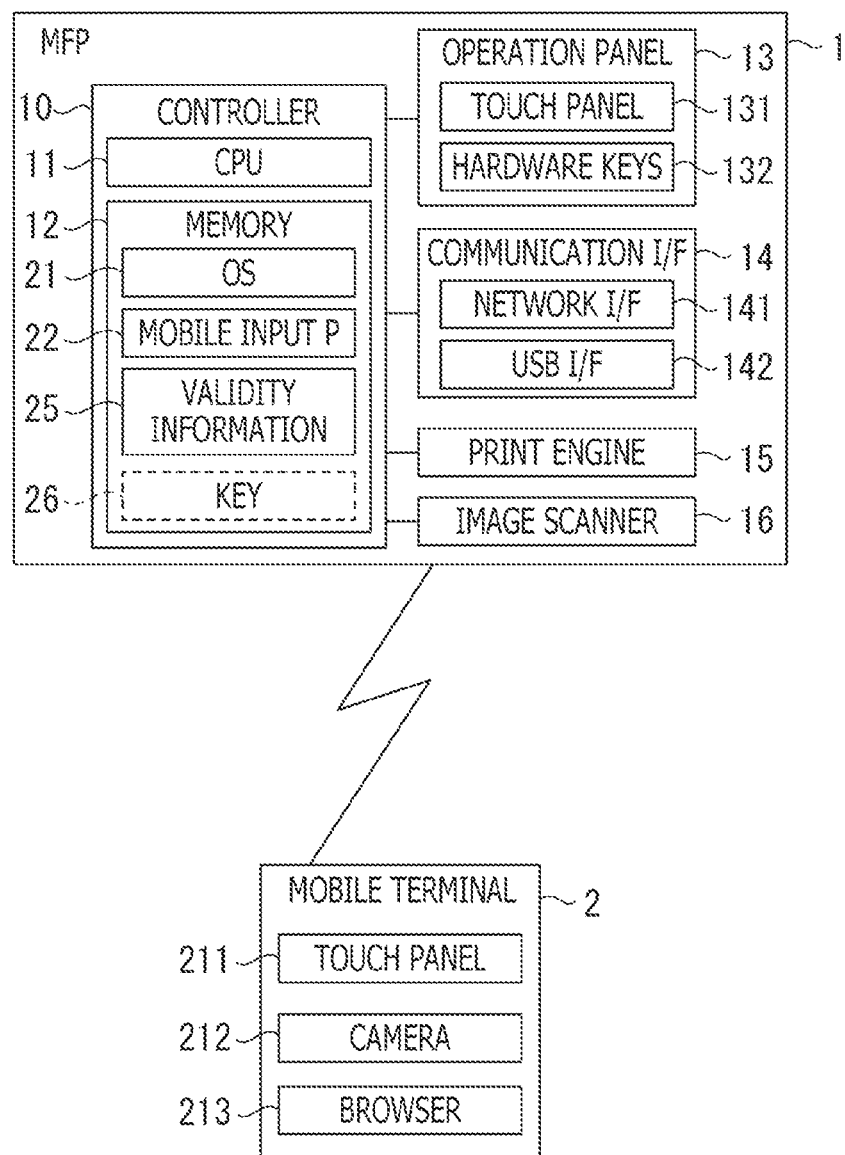
FIG. 1 is a block diagram schematically showing a configuration of an MFP.

As shown in FIG. 1, an MFP 1 of the first illustrative embodiment has a controller 10 including a CPU 11 and a memory 12. The MFP 1 further includes an operation panel 13, a communication I/F ("I/F" is an abbreviation for "interface") 14, a print engine 15, and an image scanner 16, which are electrically connected with the controller 10.

The CPU 11 is configured to perform various processes according to programs read out from the memory 12 and/or based on user operations. The "controller 10" in FIG. 1 is a term for collectively referring to hardware and software used to control the MFP 1, and may not necessarily represent a single piece of hardware actually existing in the MFP 1.

The memory 12 of the MFP1 in the first illustrative embodiment is configured to store various types of data and various programs including an operating system (hereinafter referred to as an "OS") 21 and a mobile input function program (hereinafter referred to as a "mobile input P") 22. The mobile input P 22 includes a program that has an embedded web server function and provides a mobile input function using the embedded web server function. The mobile input P 22 further includes programs and data for causing the MFP 1 to serve as a web server.

The memory 12 is used as a work area when various processes are performed. A buffer provided to the CPU 11 may be included in examples of the memory 12. Examples of the memory 12 may include, but are not limited to, computer-readable storage media that are readable and writable by the CPU 11, as well as a ROM, a RAM, and an HDD that are incorporated in the MFP 1. For instance, examples of the memory 12 may include a USB memory connected with the MFP 1 via a USB I/F 142 (see FIG. 1), external memories such as an HDD, and memories and HDDs provided to external devices connected with the MFP 1 via a network I/F 141 (see FIG. 1).

The computer-readable storage media are non-transitory media. Examples of the non-transitory computer-readable storage media may include, but are not limited to, CD-ROMs and DVD-ROMs in addition to the above examples. The non-transitory computer-readable storage media are tangible media. On the other hand, an electrical signal that carries a program downloaded from a server on the Internet is a computer-readable signal medium, but is not included in examples of the non-transitory computer-readable storage media.

The operation panel 13 includes a hardware element configured to display screens for notifying the user of information and hardware elements configured to accept user operations. Specifically, for instance, the operation panel 13 of the MFP 1 in the first illustrative embodiment includes a touch panel 131 configured to display screens and receive operations, and one or more hardware keys 132 configured to receive operations.

The communication I/F 14 includes the network I/F 141 configured to connect the MFP 1 with a network and the USB I/F 142. The MFP 1 may further include one or more communication I/Fs compliant with other communication standards.

The print engine 15 includes a configuration for printing an image on a printing medium such as a sheet. Examples of image forming methods applicable to the print engine 15 may include, but are not limited to, an electrophotographic method and an inkjet method. The image scanner 16 includes a configuration for scanning an image of a document. The image scanner 16 may include an automatic document feeder.

Subsequently, operations by the MFP 1 will be described. The following processes basically indicate the processing by the CPU 11 according to instructions described in programs. Namely, in the following description, processes such as "judging," "extracting," "selecting," "calculating," "determining," "identifying," "specifying," "obtaining," "acquiring," "accepting," "receiving," and "controlling" represent the processing by the CPU 11. The processing by the CPU 11 includes hardware control using an API ("API" is an abbreviation for "Application Programming Interface") for the OS 21. In the following description, the description of the OS 21 may be omitted to explain operations of each program. Namely, in the following description, the description "Program B controls hardware C" may represent "Program B controls hardware C using the API for the OS 21." In addition, the processing by the CPU 11 according to instructions described in a program may be described in an abbreviated expression. For instance, it may be described as "the CPU 11 performs the processing." Moreover, the processing by the CPU 11 according to instructions described in a program may be described in an abbreviated expression with the CPU 11 omitted, such as "Program A performs the processing."

It is noted that "obtaining" and "acquiring" may be used as concepts that do not necessarily require a request. Namely, a process of the CPU 11 receiving data without making a request may be included in concepts of "the CPU 11 obtains (acquires) data." In addition, "data" in the following description may be represented as a computer-readable bit sequence. Further, a plurality of pieces of data that have substantially the same semantic contents but different formats shall be treated as the same data. The same applies to "information" in the following description. Moreover, "requesting" may be a concept representing to output, to the other party, information indicating what is requested. Furthermore, "instructing" may be a concept representing to output, to the other party, information indicating what instruction is provided. Information indicating what is requested and information indicating what instruction is provided may be referred to simply as a "request" and an "instruction," respectively.

A process by the CPU 11 to determine whether information A indicates that it is matter B may be described conceptually as "it is determined from information A whether it is matter B." A process by the CPU 11 to determine whether information A indicates that it is matter B or indicates that it is matter C may be described conceptually as "it is determined from information A whether it is matter B or matter C."

Figure 2A:
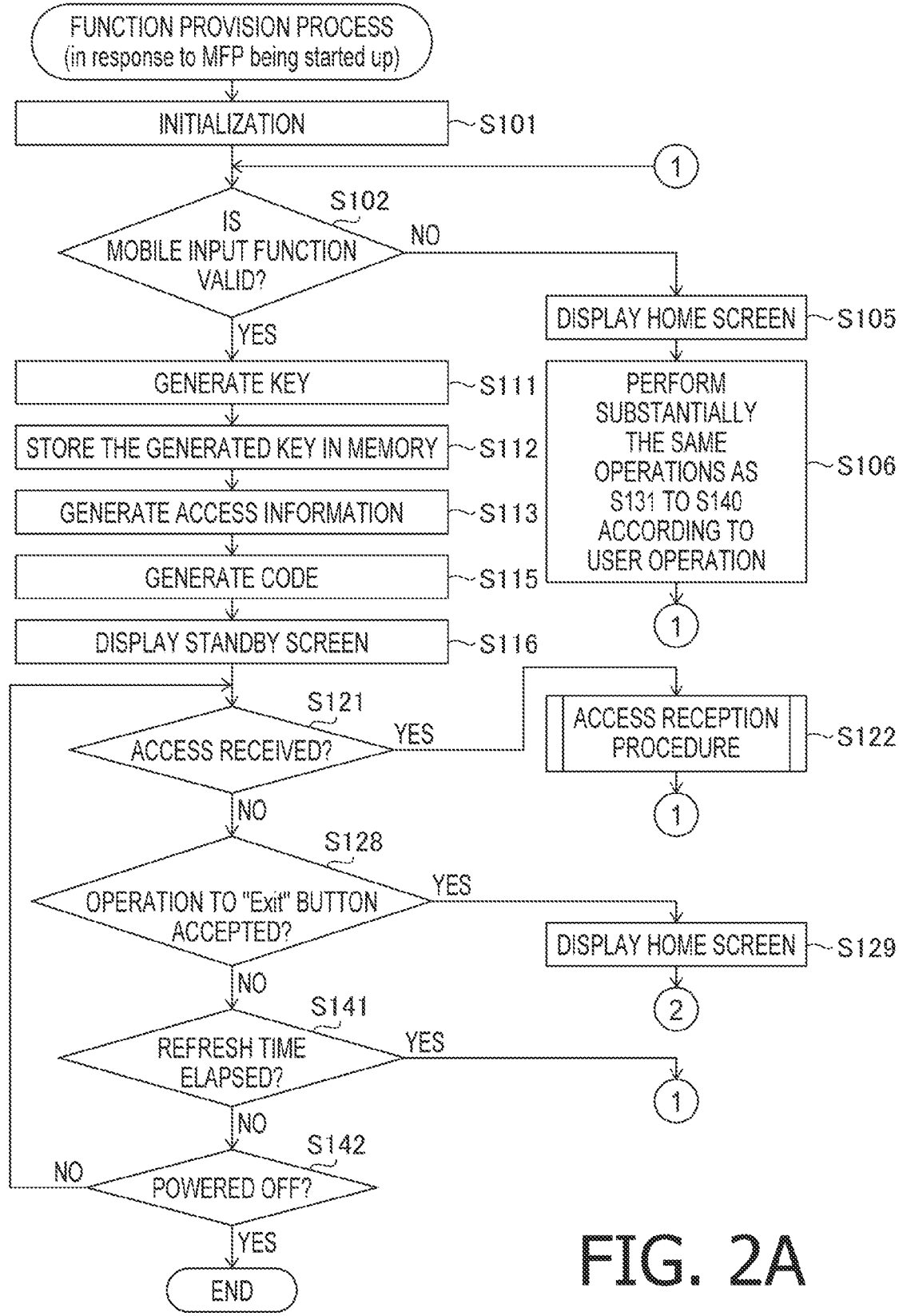
FIGS. 2A and 2B are flowcharts showing a procedure of a function provision process.
Figure 2B:
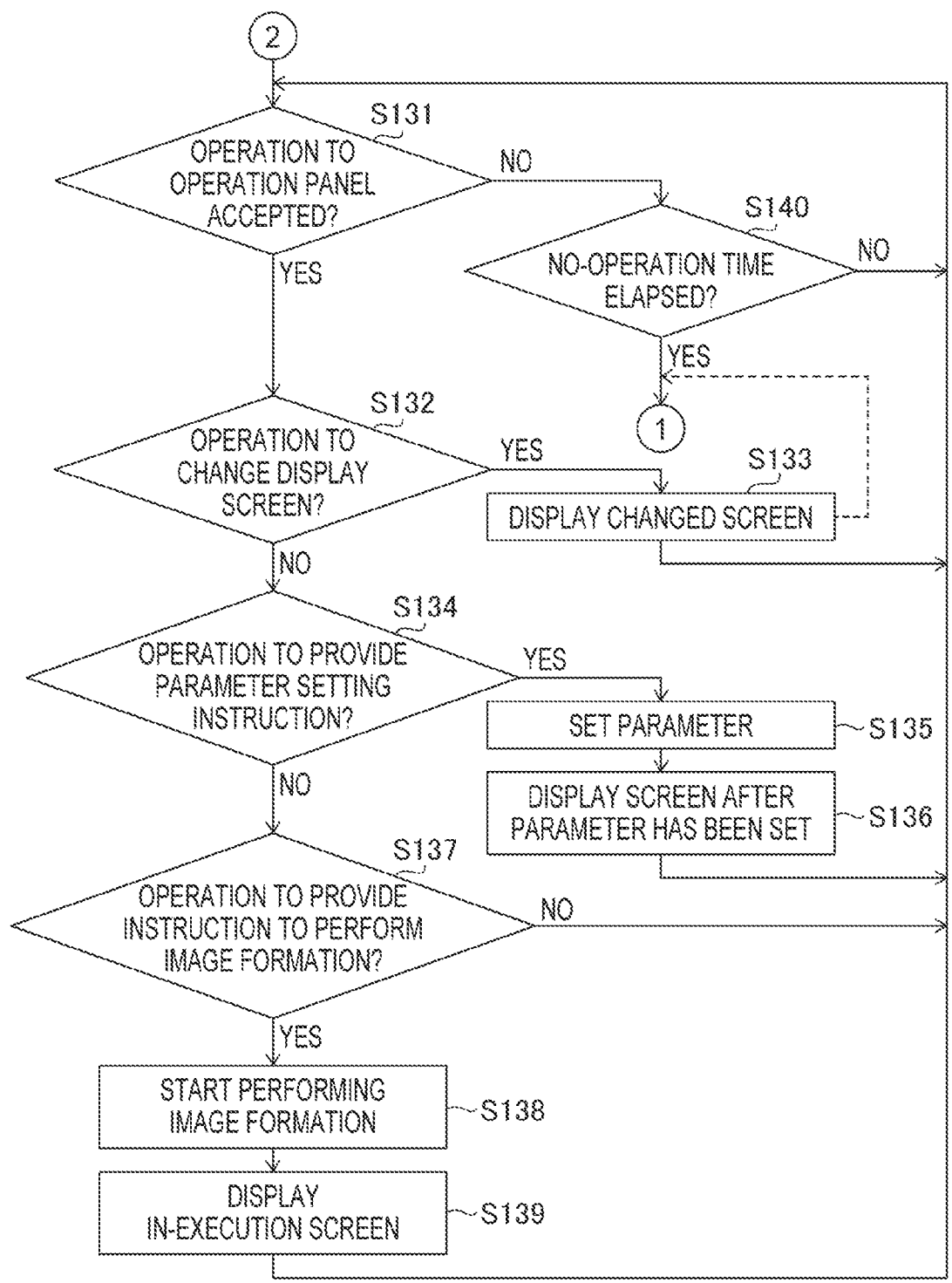

Referring to FIGS. 2A and 2B, an explanation will be provided of a procedure of a function provision process to, in response to user operations, provide various functions in the MFP 1 having various functions such as a mobile input function using the mobile input P 22. The function provision process is performed by the CPU 11 of the MFP 1 in response to the MFP 1 being started up.

The CPU 11 initializes each of the elements such as the memory 12 (S101). Then, the CPU 11 determines whether validity information 25, indicating whether the mobile input function is valid, is stored in the memory 12 (S102). The MFP 1 accepts a setting instruction for the validity information 25, i.e., a setting instruction to set the mobile input function valid or invalid, for instance, via the USB I/F 142. After accepting an input of the validity information 25, the MFP 1 stores the validity information 25 in a non-volatile storage area of the memory 12, as shown in FIG. 1. Thus, it is possible to improve user-friendliness since the user is allowed to set the mobile input function valid or invalid with the validity information 25.

For instance, the MFP 1 may be configured to not accept a setting instruction for the validity information 25 via the network I/F 141. In another instance, the MFP 1 may be configured to accept a setting instruction via the network I/F 141 when the setting instruction has been made by a user having administrator authority. The validity information 25 is important information indicating whether the mobile input function is valid. It is possible to restrict immoderate changes by a third party, by limiting the cases where the input of the validity information is acceptable to particular cases such as a case where the validity information 25 is read out from a USB memory and a case where the setting instruction for the validity information 25 is made by the user having the administrator authority.

Figure 3:
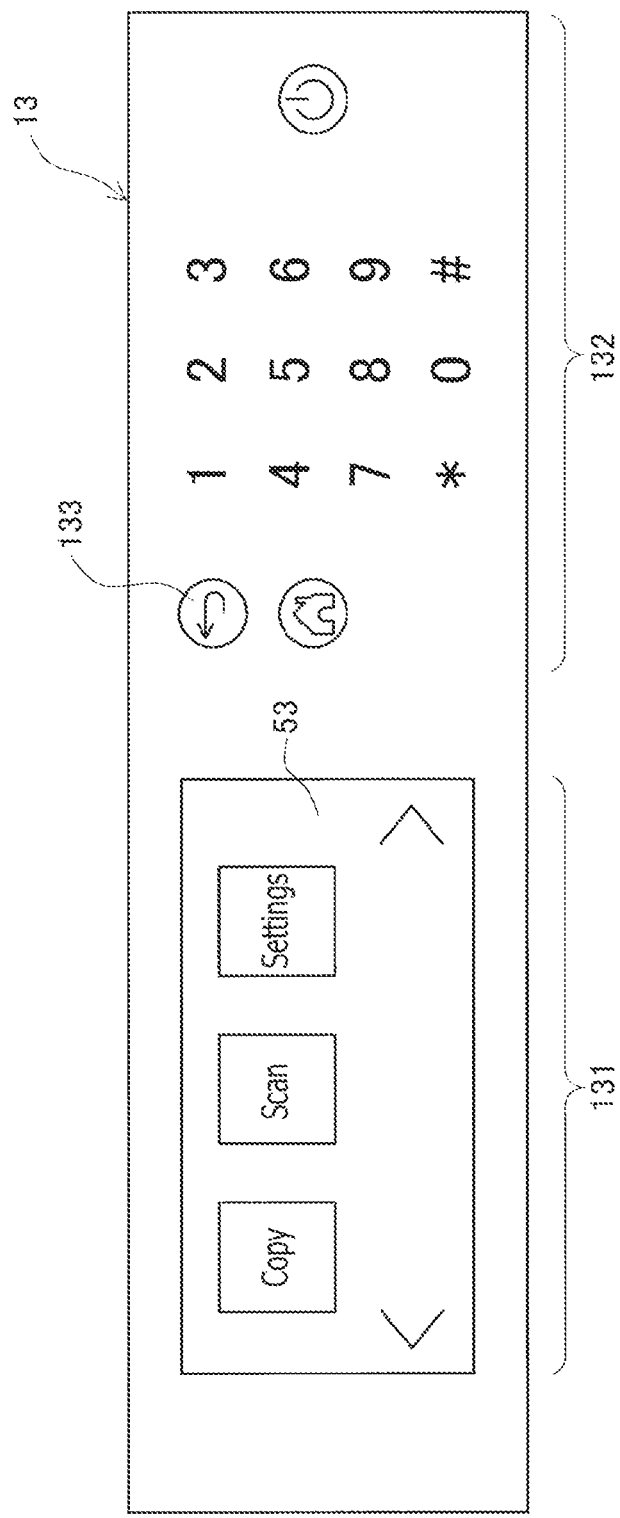
FIG. 3 shows an example of a home screen.

When determining that the validity information 25 is not stored in the memory 12, i.e., the mobile input function is not valid (S102: No), the CPU 11 does not generate access information and displays on the touch panel 131 a home screen 53, e.g., as shown in FIG. 3 (S105). For instance, the home screen 53 is a screen including various objects configured to accept input operations such as operations to select functions to be executed on the MFP 1 and operations to input various setting instructions.

When the mobile input P 22 is not enabled, the MFP 1 does not provide the function of the mobile input P 22, but accepts an operation to the touch panel 131 and operates based on the accepted operation (S106). When the mobile input P 22 is not enabled, the MFP 1 operates based on a user operation to the touch panel 131, in substantially the same manner as in after-mentioned steps S131-S140. Specifically, in response to receipt of a parameter setting instruction, the MFP 1 sets parameter(s). In addition, in response to receipt of an instruction to perform image formation, the MFP 1 performs image formation using the parameter(s) as set. Then, in substantially the same manner as when an affirmative determination is made in S140 (S140: Yes), when a particular no-operation time has elapsed without any operations to the operation panel 13, the CPU 11 goes back to S102 and displays the home screen 53 again. When having accepted via the operation panel 13 an operation to provide an instruction to display the home screen, as well, the CPU 11 displays the home screen 53 on the touch panel 131.

The MFP 1 of the first illustrative embodiment accepts a setting to render the mobile input function valid or invalid. Thus, it is possible to improve the user-friendliness since the MFP 1 is enabled to set the mobile input function unavailable. For instance, if the CPU 11 once accepts the setting to render the mobile input function valid and then accepts the setting to render the mobile input function invalid, the CPU 11 may delete an after-mentioned key 26 (see FIG. 1) if the key 26 is stored in the memory 12.

On the other hand, when determining that the validity information 25 is stored in the memory 12, i.e., the mobile input function is valid (S102: Yes), the CPU 11 performs individual processes for starting to provide the mobile input function.

Specifically, the CPU 11 generates a key (S111) and stores the generated key in the memory 12 (S112). The key is, for instance, a character string including a plurality of characters. The CPU 11 generates a different key each time S111 is executed. Through the execution of S112, the latest key 26 is stored in the memory 12, as shown in FIG. 1. For instance, the MFP 1 may overwrite the previous key and store only the latest key in S112. In another instance, the MFP 1 may store a plurality of keys and store the latest key with information indicating that it is the latest key or information indicating the date and time when it was generated.

The CPU 11 generates the latest access information that includes the latest key 26 generated in S111 and stored in S112 (S113). The access information generated in S113 is information in which information of the key 26 generated in S111 is added as a query to a URL containing a path indicating the mobile input function of the mobile input P 22.

Figure 4:
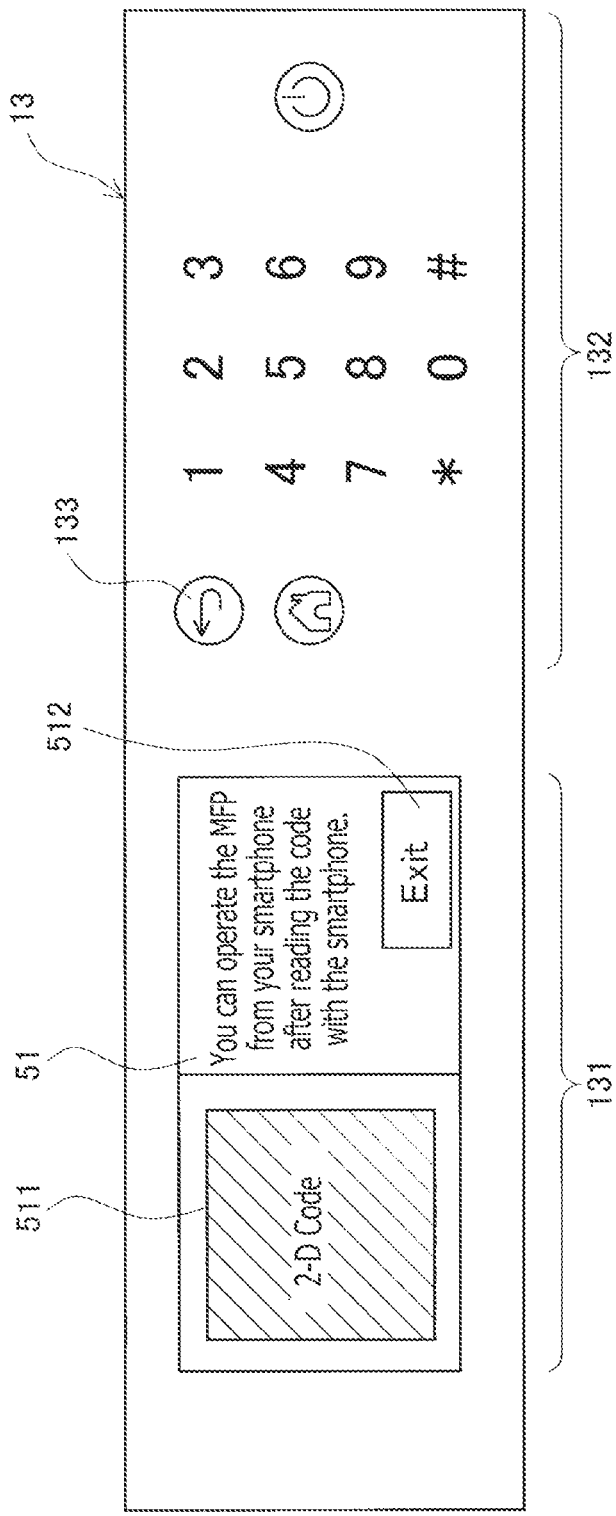
FIG. 4 shows an example of a standby screen.

Further, the CPU 11 encodes the latest access information generated in S113, thereby generating a latest two-dimensional code, for instance, a QR code ("QR Code" is a registered trademark of DENSO WAVE INCORPORATED) (S115). Then, the CPU 11 displays a standby screen including the generated code on the touch panel 131 of the operation panel 13 (S116). Thereby, as shown in FIG. 4, the latest standby screen 51 including the latest two-dimensional code is displayed on the touch panel 131. The standby screen 51 is a screen that includes a two-dimensional code image 511, which is an image resulting from encoding the access information, and an "Exit" button 512. By displaying the standby screen 51 that includes the two-dimensional code image 511 including the latest key 26 and does not include a two-dimensional code image that is not the latest, it is possible to avoid the access information from being displayed in a more complicated manner.

The CPU 11 then determines whether access from an external device (e.g., a mobile terminal 2) has been received (S121). Each user who uses the mobile input function on the MFP 1 of the first illustrative embodiment may use a mobile terminal 2 configured to connect with the same network as connected with the MFP 1. The communication between the network I/F 141 and an access point may be performed via wireless communication (e.g., Wi-Fi communication) or wired communication (e.g., wired LAN). It is noted that "Wi-Fi" is a registered trademark of the non-profit Wi-Fi Alliance.

As shown in FIG. 1, the mobile terminal 2 includes a touch panel 211 and a camera 212. A memory of the mobile terminal 2 stores various programs including a browser 213, and various types of data. The mobile terminal 2 is a device configured to connect with a network. Examples of the mobile terminal 2 may include, but are not limited to, smartphones and tablet computers.

For instance, the same network may be a network provided by the same access point. In this case, the mobile terminal 2 and the MFP 1 need only to be connected with the same access point. In another instance, a plurality of access points may form a single network. In this case, the mobile terminal 2 and the MFP 1 need only to be connected with one of the plurality of access points forming the single network. The mobile terminal 2 and the MFP 1 may be configured to connect with the Internet via an access point.

For instance, the user activates the camera 212 of the mobile terminal 2 and takes a picture of the two-dimensional code image 511 displayed on the touch panel 131 of the MFP 1. By analyzing the captured two-dimensional code image 511, the mobile terminal 2 obtains the encoded access information. The read two-dimensional code image 511 contains the URL. Hence, the mobile terminal 2 inquires of the user whether to access a transmission destination device indicated by the URL, for instance, by displaying a pop-up on the touch panel 211. In response to receiving an access instruction from the user, the mobile terminal 2 activates the browser 213 and accesses the MFP 1 based on the access information obtained.

As described above, the access information contained in the two-dimensional code image 511 includes the URL and the key. The browser 213 sends an HTTP request according to an http protocol or an HTTPS request according to an https protocol, based on the access information. Hereinafter, the HTTP request or the HTTPS request may be referred to simply as a "request." The browser 213 of mobile terminal 2 identifies a network address of the transmission destination device indicated by the URL contained in the access information, and sends to the transmission destination device a request that includes the path indicated by the URL, and the query including the key.

The user may use the mobile terminal 2 in front of the MFP 1, thereby easily accessing the MFP 1 and easily using the mobile input function without having to remember the access information. In the first illustrative embodiment, the MFP 1 is configured to display the two-dimensional code image 511 that is readable by the mobile terminal 2. Therefore, the user is allowed to easily access the MFP 1 using the camera 212 of the mobile terminal 2. The MFP 1 may be configured to display the URL in text. Even in that case, although the user has to go through a troublesome operation of inputting the access information, the user is allowed to easily access the MFP 1 with no need to remember the access information.

When determining that access with a path specified that indicates the mobile input function has been received (S121: Yes), the CPU 11 performs an access reception procedure (S122). The access reception procedure is a procedure when access is accepted. However, when the validity information 25 is not stored in the memory 12, and the mobile input function is not valid, the CPU 11 makes a negative determination in S121 (S121: No) even if the access with the path specified that indicates the mobile input function is received.

Next, the access reception procedure will be described with reference to a sequence chart shown in FIG. 5. In response to accepting the access with the path specified that indicates the mobile input function, the MFP 1 performs a process according to the mobile input P 22.

The MFP 1 first obtains the key included as a query in the access information (A11), and then checks whether the obtained key matches the latest key 26 stored in the memory 12 (A12).

When determining that the key included in the access information matches the latest key 26 stored in the memory 12 (alt: [OK]), the MFP 1 sends start screen data to the mobile terminal 2 which is a device that has sent a request (A21). The start screen data is web page data representing a start screen.

Figure 6:
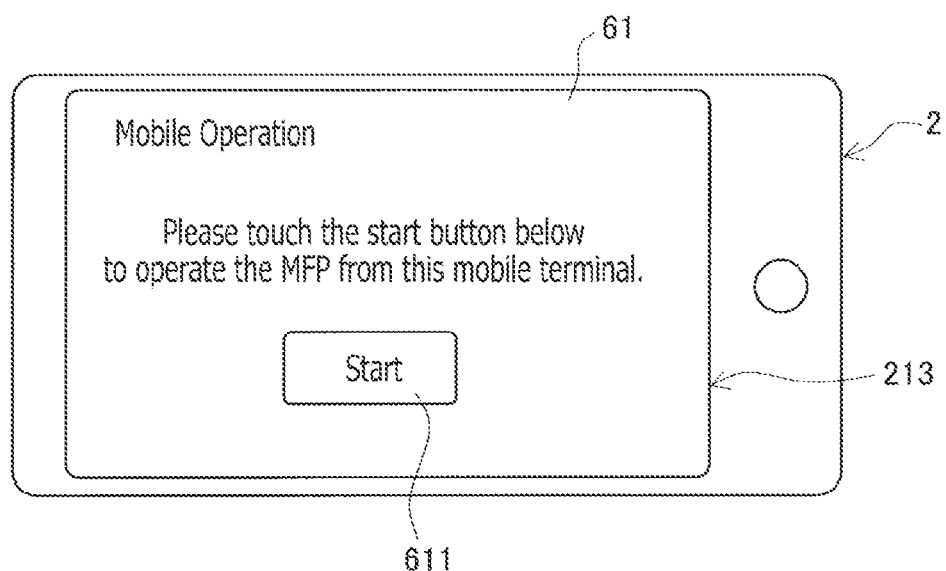
FIG. 6 shows an example of a start screen.

The browser 213 of the mobile terminal 2 is configured to, when receiving the web page data sent by the MFP 1 in response to the request from the mobile terminal 2, display on the touch panel 211 a web page that is a screen based on the received data. In response to receiving the start screen data sent by the MFP 1 in A21, the browser 213 displays a start screen 61 on the touch panel 211, e.g., as shown in FIG. 6 (A23). The start screen 61 is a screen including a start button 611.

The browser 213 of the mobile terminal 2 is further configured to, when receiving a user operation to the touch panel 211 while the screen based on the web page data sent by the MFP 1 is being displayed, send to the MFP 1 a request that includes operation data indicating what information or instruction is provided by the received operation. The operation data may include object information indicating which object has received the operation and/or position information indicating an operated position on the touch panel 211.

The MFP 1 determines whether operation data indicating an operation to the start button 611 has been received from the mobile terminal 2, and determines whether an operation to the "Exit" button 512 has been received on the standby screen 51 being displayed on the touch panel 131.

First, an explanation will be provided of the case where it is determined that operation data indicating an operation to the start button 611 has been received (alt: [Start]). In response to receiving a user operation to the start button 611 (A24), the mobile terminal 2 sends to the MFP 1 operation data indicating the operation to the start button 611 (A25). The operation to the start button 611 is a user instruction to cause the MFP 1 to start providing the mobile input function. Thereby, the MFP 1 receives the operation data (hereinafter, which may be referred to as the "start information") indicating the operation to the start button 611.

The MFP 1 starts providing the mobile input function in response to receiving the clear intention (i.e., the operation to the start button 611) of the user of the mobile input function. Namely, it is possible to avoid the mobile input function from inadvertently beginning to be provided, e.g., due to a user's misoperation.

Figure 7:
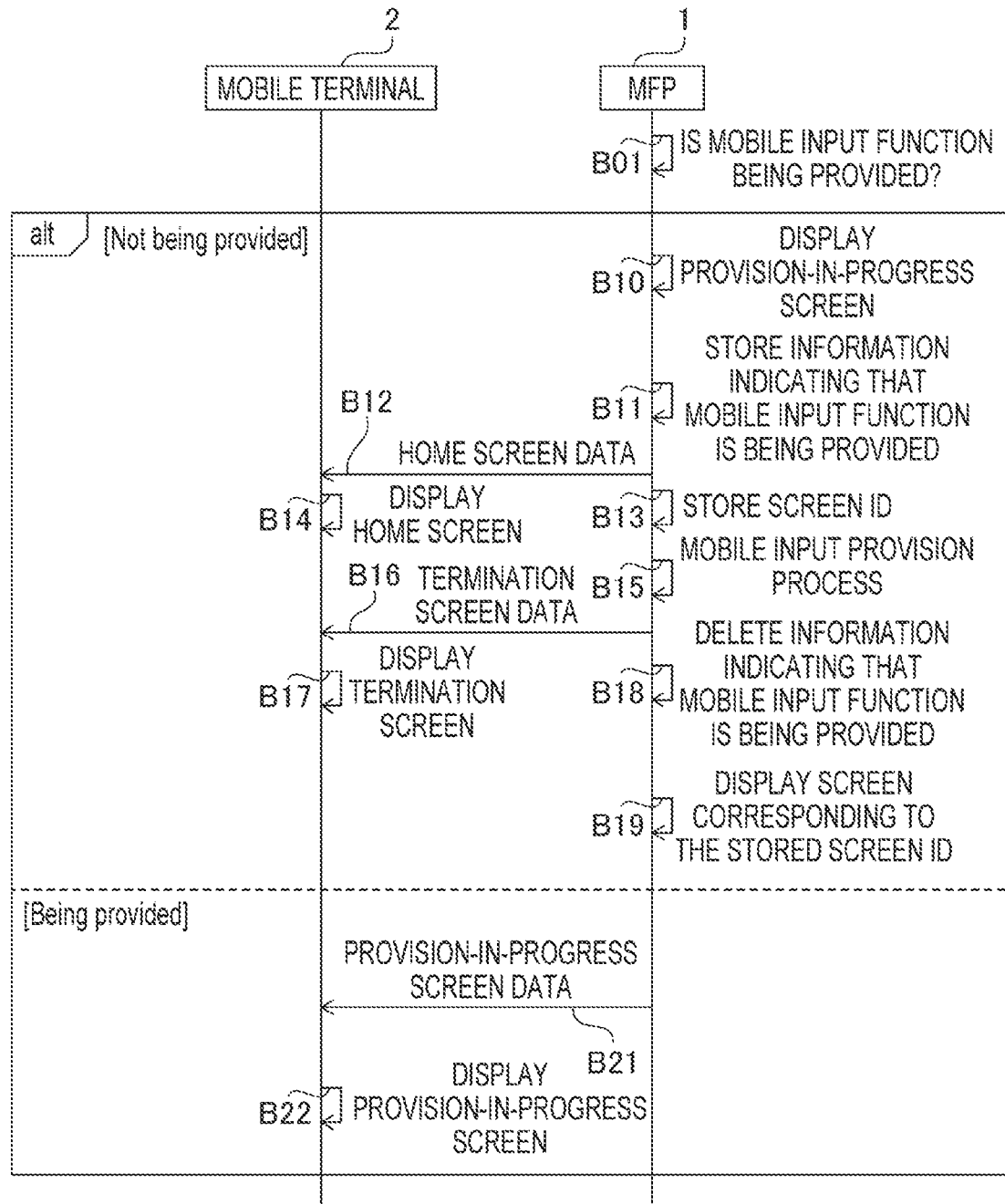
FIG. 7 is a sequence chart showing an example of a start procedure.

The MFP 1 performs a start procedure shown in FIG. 7 in response to receiving the start information. In the start procedure, the MFP 1 first determines whether the mobile input function is being provided (B01). For instance, when information indicating that the mobile input function is being provided is stored in the memory 12, the mobile input P 22 (more exactly, the MFP 1 executing the mobile input P 22) determines that the mobile input function is being provided. For instance, the information indicating that the mobile input function is being provided is stored in the memory 12 in B11.

Figure 8:
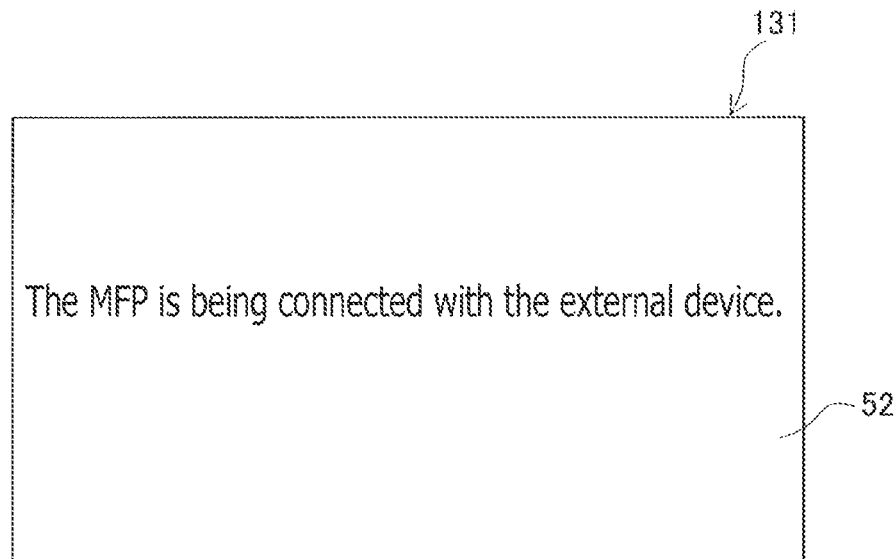
FIG. 8 shows an example of a provision-in-progress screen.

When determining that the mobile input function is not being provided (alt: [Not being provided]), the MFP 1 stops displaying the standby screen 51 and displays a provision-in-progress screen 52 as shown in FIG. 8 on the whole of the touch panel 131 (B10). The provision-in-progress screen 52 is a screen that includes a message indicating that the MFP 1 is being connected with another device and does not include any objects for accepting operations. When beginning to provide the mobile input function, the MFP 1 causes the touch panel 131 to display neither a screen (e.g., the standby screen 51 shown in FIG. 4) that includes the access information nor a screen that includes objects for accepting various operations. The MFP 1 does not accept input operations to the touch panel 131 while providing the mobile input function to the mobile terminal 2.

If an input operation to the touch panel 131 is acceptable while the mobile input function is being provided, the user may be confused by an operation being performed that is not intended by the user operating the mobile terminal 2. In the first illustrative embodiment, such a problem does not occur since the MFP 1 is configured to not accept an input operation to the touch panel 131 during the provision of the mobile input function. In addition, the MFP 1 of the first illustrative embodiment is configured to display the provision-in-progress screen 52 on the touch panel 131 during the provision of the mobile input function. Therefore, it is easy for the user to recognize that an input operation to the touch panel 131 is not acceptable.

If access from another mobile terminal is acceptable while the mobile input function is being provided, the user may be confused by an operation being performed that is not intended by the user operating the mobile terminal 2. In the first illustrative embodiment, the MFP 1 is configured to not display the standby screen 51 on the touch panel 131 during the provision of the mobile input function. Therefore, it is possible to reduce the possibility that the MFP 1 accepts access from another user.

The MFP 1 then stores information indicating that the mobile input function is being provided (B11) and sends home screen data to the mobile terminal 2 (B12). The home screen data is web page data indicating the home screen. Moreover, the MFP 1 stores in the memory 12 a screen ID for identifying the screen of which the screen data has been sent (B13). In this case, the screen ID is information indicating the last screen data sent to the mobile terminal 2, i.e., information indicating the home screen.

Figure 9:
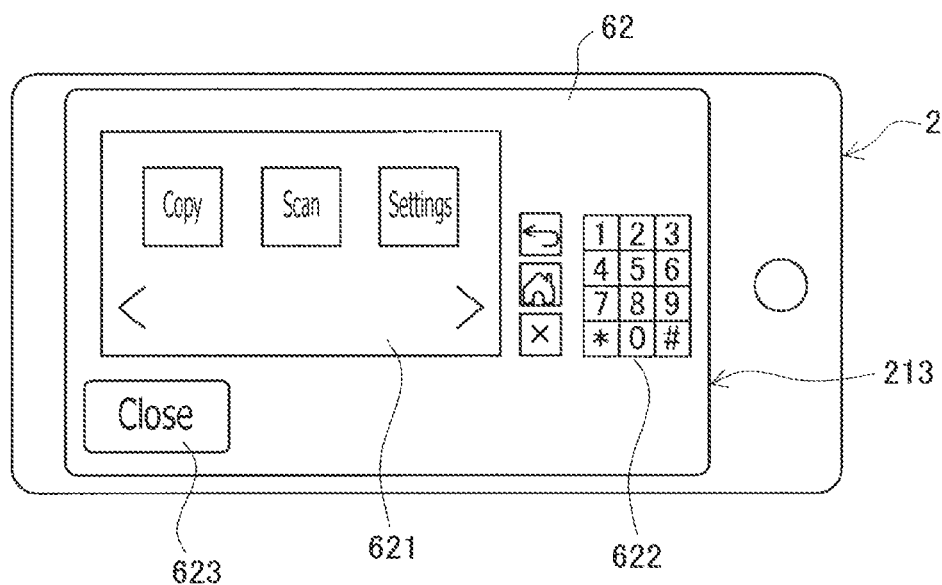
FIG. 9 shows an example of an operation screen.

In response to receipt of the home screen data in B12, the browser 213 of the mobile terminal 2 causes the touch panel 211 to display a home screen 62, for instance, as shown in FIG. 9 (B14). For instance, the home screen 62 is an operation screen that virtually shows the operation panel 13 on which the home screen 53 shown in FIG. 3 is displayed. The home screen 62 includes a panel screen 621 configured in imitation of the home screen 53, a key screen 622 configured in imitation of the hardware keys 132 of the operation panel 13, and a close button 623.

The home screen 62 includes the panel screen 621 that imitates the home screen 53. Therefore, the user may intuitively operate the screen displayed on the mobile terminal 2 in substantially the same manner as when operating the touch panel 131.

Then, the MFP 1 performs a mobile input provision process (B15). The mobile input provision process in B15 will be described with reference to FIGS. 10A and 10B. The mobile input provision process is performed by the CPU 11 of the MFP 1 based on the mobile input P 22. At the start of the mobile input provision process, the touch panel 211 of the mobile terminal 2 displays the home screen 62 shown in FIG. 9, and the touch panel 131 of the MFP 1 displays the provision-in-progress screen 52 shown in FIG. 8.

The CPU 11 starts measuring a time elapsed without any request received from the mobile terminal 2 since sending the screen data to the mobile terminal 2 (S201). At the start of the mobile input provision process, the CPU 11 measures the elapsed time since sending the home screen data in B12 in FIG. 7.

Then, the CPU 11 determines whether a request from the mobile terminal 2 has been received (S202). When determining that the request has been received (S202: Yes), the CPU 11 resets the elapsed time and restarts the measurement (S211). Then, the CPU 11 determines whether operation data included in the received request indicates an operation to the close button 623 (see FIG. 9) (S212).

When determining that the operation data included in the received request indicates an operation other than the operation to the close button 623 (S212: No), the CPU 11 determines whether the operation data included in the received request indicates an operation to change the display screen (S221). When determining that the operation data included in the received request indicates an operation to change the display screen (S221: Yes), the CPU 11 sends to the mobile terminal 2 screen data representing the changed screen (S222).

For instance, when receiving operation data indicating that an operation to a "Copy" button on the panel screen 621 has been accepted via the home screen 62 shown in FIG. 9, the CPU 11 sends screen data of a copy screen to the mobile terminal 2 in S222. The copy screen is a screen configured to accept the setting of parameters related to copying. An operation screen for accepting the setting of parameters may be referred to as a "parameter setting screen." As a result, the copy screen is displayed on the touch panel 211 of the mobile terminal 2.

In the mobile input provision process, the CPU 11 sends only web page data of a portion of the panel screen 621, unlike the case of B12 in FIG. 7, in sending the screen data in S222 and the subsequent steps. Namely, during the execution of the mobile input provision process, only the panel screen 621 is changed of the screen displayed on the touch panel 211 of the mobile terminal 2. Therefore, even when the screen is changed, e.g., in S222, the close button 623 still remains displayed on the touch panel 211 of the mobile terminal 2.

When determining that the operation data included in the received request does not indicate an operation to change the display screen (S221: No), the CPU 11 determines whether the operation data included in the received request indicates an operation related to setting of a parameter used for image formation (i.e., whether the operation data included in the received request indicates an operation to provide a parameter setting instruction for image formation) (S224). When determining that the operation data included in the received request indicates an operation related to setting of a parameter used for image formation (S224: Yes), the CPU 11 sets the parameter based on the received operation data (S225).

Further, the CPU 11 sends to the mobile terminal 2 screen data representing a screen after the parameter has been set (S226). For instance, when having accepted the number of copies specified via the aforementioned copy screen, the CPU 11 sets the accepted number of copies as a parameter for copying and sends screen data of the copy screen with the displayed number of copies changed to the mobile terminal 2.

When determining that the received operation data does not indicate an operation related to setting of a parameter used for image formation (S224: No), the CPU 11 determines whether the received operation data indicates an operation related to execution of image formation (i.e., whether the received operation data indicates an operation to provide an instruction to perform image formation) (S227). When determining that the received operation data indicates an operation related to execution of image formation (S227: Yes), the CPU 11 starts executing image formation based on the received operation data (S228).

For instance, when receiving operation data indicating that an execution instruction button for copying has been operated on the copy screen, the CPU 11 starts executing copying by causing the image scanner 16 to start scanning a document and causing the print engine 15 to perform printing based on an image of the scanned document. An operation screen for accepting an execution instruction may be referred to as an "execution instruction screen."

Then, the CPU 11 sends to the mobile terminal 2 screen data of a screen indicating that image formation is in execution (S229). The screen indicating that image formation is in execution includes a message indicating that image formation is in execution and does not include any object for receiving operations other than the close button 623. The CPU 11 sends to the mobile terminal 2 screen data including, for instance, a message "copying is in execution." The CPU 11 may stop the measurement of the elapsed time during the execution of image formation, i.e., during a period of time when the screen indicating that image formation is in execution is being displayed, since the CPU 11 does not accept any operations during that period of time. The screen indicating that image formation is in execution may also include an object for accepting operations, such as an object configured to accept an operation to stop the execution of image formation.

The various screens to be displayed on the panel screen 621 are configured in imitation of the various screens that are displayed on the touch panel 131 of the MFP 1 when the MFP 1 is used through operations to the touch panel 131. For instance, the aforementioned copy screen is substantially the same as or similar to the screen displayed on the touch panel 131 in S133 (see FIG. 2B) in the case where the "Copy" button is operated on the touch panel 131 of the MFP 1 (S132: Yes in FIG. 2B) when the mobile input function is not provided. Further, for instance, the aforementioned screen including the message "copying is in execution" is substantially the same as or similar to the screen displayed on the touch panel 131 in S139 (see FIG. 2B) in the case where the execution instruction button for copying is operated on the touch panel 131 of the MFP 1 (S137: Yes in FIG. 2B) when the mobile input function is not provided.

On the other hand, when determining that the received operation data does not indicate an operation related to execution of image formation (S227: No), the CPU 11 goes back to S202 to determine whether operation data has been received from the mobile terminal 2. For instance, if the CPU 11 receives operation data indicating an operation to an area other than the objects among all the areas on the touch panel 211 of the mobile terminal 2, the CPU 11 may perform in S211 only resetting the elapsed time, and neither changing the screen, parameter setting, nor executing image formation.

After sending the screen data in one of the steps S222, S226, and S229, the CPU 11 stores a screen ID for identifying the sent screen data in the memory 12 (S231). Thereafter, the CPU 11 goes back to S202 to determine whether a request from the mobile terminal 2 has been received. The CPU 11 may store the screen ID in a particular area by overwriting a previously stored one, or may store the screen ID as information indicating a last sent one of a plurality of screen IDs stored in the memory 12.

On the other hand, when determining that no request from the mobile terminal 2 has been received (S202: No), the CPU 11 determines whether the elapsed time that began to be measured in S201 has exceeded a particular time-out time (S203). For instance, the time-out time is one minute. The time-out time may be a fixed time or a variable time that is settable by the user.

When determining that the elapsed time has exceeded the time-out time (S203: No), the CPU 11 determines whether a long press operation to a back key 133 (see FIG. 4) has been accepted (S204). The back key 133 is included in the hardware keys 132 of the operation panel 13.

When determining that the operation data included in the received request indicates an operation to the close button 623 (S212: Yes), or when determining that the elapsed time has exceeded the time-out time (S203: Yes), or when determining that a long press operation to the back key 133 has been accepted (S204: Yes), the CPU 11 terminates the mobile input provision process and returns to the start procedure shown in FIG. 7.

The close button 623 is a button to be operated by the user on the mobile terminal 2 to terminate the use of the mobile input function. An operation to the close button 623 is an operation that indicates the user's intention to terminate the use of the mobile input function.

The MFP 1 terminates the mobile input function based on the operation to the close button 623. Therefore, it is possible to terminate the mobile input function at a timing intended by the user using the mobile terminal 2. As a result, another user is allowed to operate the MFP 1, thereby increasing a utilization rate of the MFP 1. The close button 623 is included in the screen displayed on the touch panel 211 of the mobile terminal 2, but not in the screen displayed on the touch panel 131 of the MFP 1.

When the elapsed time has exceeded the time-out time with no request from the mobile terminal 2, the use of the MFP 1 by the user of the mobile terminal 2 is likely to have been terminated. Alternatively, the communication between the MFP 1 and the mobile terminal 2 may have been disconnected. By terminating the mobile input function when there is no request received from the mobile terminal 2 for more than the particular time-out time, the MFP 1 may automatically terminate the provision of the mobile input function, for instance, even though the user of the mobile terminal 2 does not perform an operation to terminate the mobile input function when the user has finished using the MFP 1. As a result, another user is allowed to use the MFP 1, thereby avoiding unnecessary occupation of the MFP 1 by the mobile terminal 2 and increasing the utilization rate of the MFP 1.

The long press operation to the back key 133 is an operation to be performed by a user who wishes to terminate the mobile input function being provided and use the MFP 1 by operating the operation panel 13. For instance, if the user of the mobile terminal 2 leaves the MFP 1 without performing an operation to terminate the mobile input function when having finished using the MFP 1, another user may forcibly terminate the provision of the mobile input function by a long press operation to the back key 133. As a result, the said another user is allowed to operate the MFP 1 even if the elapsed time has not exceeded the time-out time, thereby increasing the utilization rate of the MFP 1.

While the MFP 1 is providing the mobile input function, the MFP 1 does not accept any operation to the hardware keys 132 or to the touch panel 131, except for an instruction to terminate the mobile input function by the long press operation to the back key 133. By disabling input operations to the operation panel 13 other than the instruction to terminate the mobile input function, it is possible to avoid mixing input operations for the mobile input function from the mobile terminal 2 and those from the operation panel 13. Thereby, it is possible to avoid the possibility of accepting operations not intended by the user of the mobile terminal 2, for instance, when another user simply performs an inadvertent operation to the operation panel 13 without knowing that the MFP 1 has started providing the mobile input function.

The mobile input P 22 may be configured to terminate the mobile input provision process without waiting for the elapsed time to exceed the time-out time when determining that the communication between the MFP 1 and the mobile terminal 2 is disconnected. For instance, when the network I/F 141 is unable to connect with the Internet, or when the CPU 11 detects that the mobile terminal 2 is unable to connect with the Internet, the CPU 11 may also terminate the mobile input provision process and return to the start procedure shown in FIG. 7.

On the other hand, when determining that one or more conditions (e.g., an operation to the close button 623) for terminating the mobile input provision process are not satisfied (S204: No), the CPU 11 determines whether the execution of image formation has been completed (S205). When determining that the execution of image formation has been completed (S205: Yes), the CPU 11 sends the home screen data to the mobile terminal 2 (S215). While image formation is in execution, a screen indicating that image formation is in execution is displayed on the mobile terminal 2 according to S229 described above. Through S215, the display on the mobile terminal 2 is changed from the screen indicating that image formation is in execution to the home screen 62. After sending the home screen data, the CPU 11 stores a screen ID for identifying the sent screen data in the memory 12 (S231). Afterward, the CPU 11 goes back to S202.

When the MFP 1 has not started performing image formation or is performing image formation, the CPU 11 determines that the execution of image formation has not been completed (S205: No). Thereafter, the CPU 11 goes back to S202, and determines whether one of the steps S202 to S205 has been satisfied.

It is noted that the MFP 1 may be configured to accept various instructions even while image formation is in execution. In such a case, for instance, the CPU 11 may send, in S229, the home screen data instead of the screen data indicating that image formation is in execution. In another instance, the MFP 1 may once send to the mobile terminal 2 the screen data indicating that image formation is in execution, and then send the home screen data before the image formation is completed. In that case, the determination in S205 may be omitted.

Referring back to FIG. 7, a continued explanation of the start procedure will be provided. In response to an affirmative determination in one of the steps S203, S204, and S212 (i.e., in either case of S203: Yes, S204: Yes, or S212: Yes) in the mobile input provision process shown in FIGS. 10A and 10B, the MFP 1 terminates the mobile input provision process (B15). Then, the MFP 1 sends to the mobile terminal 2 termination screen data, which is web page data indicating that the provision of the mobile input function has been terminated (B16). Thereby, the browser 213 of the mobile terminal 2 displays a termination screen 63 on the touch panel 211, for instance, as shown in FIG. 11 (B17). If the communication with the mobile terminal 2 is disconnected, the MFP 1 may skip B16.

Then, the MFP 1 deletes the information indicating that the mobile input function is being provided (B18). In another instance, the MFP 1 may change the information indicating that the mobile input function is being provided to information indicating that the mobile input function is not being provided, and may store the changed information.

Hereinabove, the procedure from the start to the end of the provision of the mobile input function has been described. Next, an explanation will be provided of operations (e.g., contents to be displayed on the touch panel 131) by the MFP 1 after the provision of the mobile input function is terminated.

After terminating the provision of the mobile input function, the MFP 1 displays a screen corresponding to the stored screen ID on the touch panel 131 (B19). Thereby, the touch panel 131 displays thereon substantially the same screen as the screen that is displayed on the mobile terminal 2 at the time when the provision of the mobile input function has been terminated. It is noted that the screen displayed on the touch panel 131 in B19 may not be exactly the same as the screen displayed on the mobile terminal 2, but may be a somewhat different screen containing the same types of information.

When the MFP 1 terminates the mobile input provision process while image formation is not in execution, e.g., when the MFP 1 terminates the mobile input provision process while the home screen 62 is being displayed, the MFP 1 displays the home screen 53 shown in FIG. 3 on the touch panel 131. Moreover, for instance, when the MFP 1 terminates the mobile input provision process while the copy screen is being displayed, the MFP 1 displays the copy screen on the touch panel 131. The MFP 1 is then enabled to accept user operations to the touch panel 131. In this case, if the MFP 1 accepts an operation to the touch panel 131, the MFP 1 may operate based on the accepted operation.

For a user who has started operating the MFP 1 via the mobile terminal 2 but wants to operate the MFP 1 via the touch panel 131 in the middle, it is convenient that the user is allowed to operate the close button 623, thereby switching from operating the MFP 1 via the mobile terminal 2 to operating the MFP 1 via the touch panel 131. In addition, for a user who has mistakenly operated the close button 623 as well, it is convenient that the user is allowed to continue to operate the MFP 1 via the touch panel 131. If the mobile input provision process is terminated due to the timeout or by a long press operation to the back key 133 while a parameter setting screen or an execution instruction screen is being displayed, the MFP 1 may display the home screen 53 instead of the screen displayed on the mobile terminal 2, for instance, in B19.

When there is no operation to the touch panel 131 for a particular display time after the MFP 1 has displayed the home screen 62 on the touch panel 131 in B19 in response to the mobile input provision process being terminated while image formation is not in execution, the MFP 1 goes back to S102 in FIG. 2A. For instance, the display time may be 30 seconds. The display time may be a predetermined fixed time or a variable time that is settable by the user.

Figure 12:
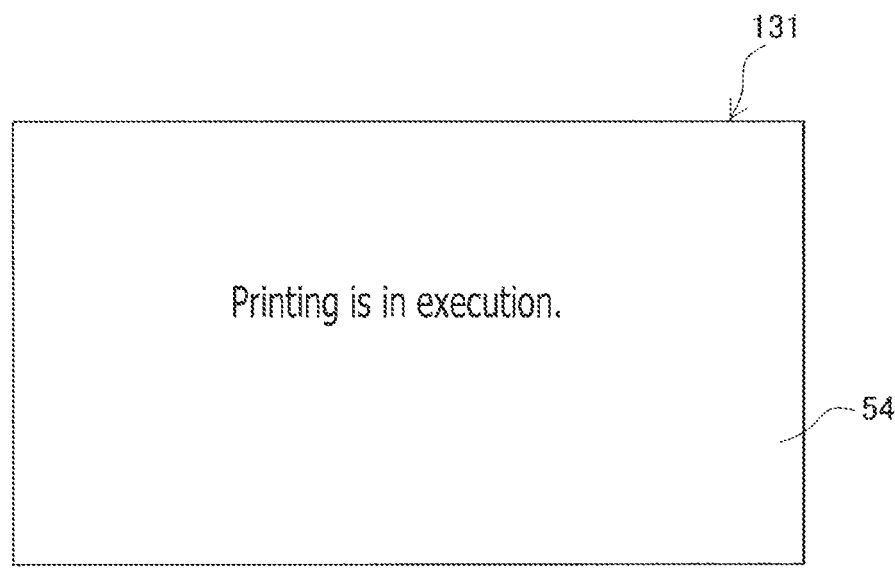
FIG. 12 shows an example of an in-execution screen.

On the other hand, for instance, when the MFP 1 has terminated the mobile input provision process in response to accepting an operation to the close button 623 or a long press operation to the back key 133 while printing is in execution, the MFP 1 displays on the touch panel 131 an in-execution screen 54 that includes a message indicating that printing is in execution, as shown in FIG. 12. If the MFP 1 displays, for instance, the home screen 53 on the touch panel 131 immediately after the user terminates the mobile input function by operating the close button 623 while a job based on an instruction from the mobile terminal 2 is in execution, the user may become anxious about whether the job is in execution. When the job is in execution, it is possible to eliminate the user's anxiety by displaying the in-execution screen 54.

When determining that the execution of image formation has been finished while the in-execution screen 54 is being displayed on the touch panel 131, the MFP 1 displays the home screen 53 (see FIG. 3) on the touch panel 131 to be enabled to accept user operations to the touch panel 131. Thereafter, the MFP 1 goes back to S102 in FIG. 2A when there has been no operation to the touch panel 131 for a predetermined display time.

The displaying of the home screen 53 in B19 is substantially the same process as in S129 of FIG. 2A. Therefore, the MFP 1 may execute S131 and the subsequent steps in FIG. 2B after having displayed the home screen 53 in B19. In that case, in S140, the CPU 11 may determine whether a display time (e.g., the particular display time or the predetermined display time) has elapsed rather than the no-operation time. The CPU 11 may determine whether the no-operation time (which is, however, longer than the display time) has elapsed.

Hereinabove, the procedure after the provision of the mobile input function is terminated has been described. Next, operations by the MFP 1 when the mobile input function is not provided will be described.

If information indicating that the mobile input function is being provided is already stored (i.e., if the MFP 1 is providing the mobile input function to another mobile terminal) when the MFP 1 has received the start information from the mobile terminal 2 (A25 in FIG. 5), the MFP 1 will determine that the mobile input function is being provided (B01). When determining that the mobile input function is being provided (alt: [Being provided]), the MFP 1 sends provision-in-progress screen data to the mobile terminal 2 (B21). The provision-in-progress screen data represents a screen that contains a message notifying that the mobile input function is unavailable since it is being provided to another mobile terminal. The provision-in-progress screen data may be screen data representing substantially the same screen as the provision-in-progress screen 52 shown in FIG. 8, or may be screen data representing a screen that contains substantially the same message as contained in, but is different from, the provision-in-progress screen 52. In the first illustrative embodiment, the MFP 1 does not simultaneously provide the mobile input function to two or more mobile terminals.

Based on the received provision-in-progress screen data, the mobile terminal 2 displays on the touch panel 211 a screen indicating that the mobile input function is being provided (B22). The screen displayed in B22 that indicates that the mobile input function is being provided is a screen that does not contain any objects to accept user operations. Namely, even when receiving an operation to the screen displayed in B22, the mobile terminal 2 does not send a request to the MFP 1.

If the mobile input function were provided in parallel to a plurality of mobile terminals, the MFP 1 would receive operation data based on operations by a plurality of users and therefore would be highly likely to perform an operation different from an operation each user desires the MFP 1 to perform. In the first illustrative embodiment, when the mobile input function is being provided to another mobile terminal, the MFP 1 does not start providing the mobile input function to the mobile terminal 2, thereby avoiding the confusion.

The MFP 1 may be configured to accept access from another terminal using the two-dimensional code image 511, since the MFP 1 still displays the standby screen 51 after sending the start screen data. For instance, if the MFP 1 accepts access from another mobile terminal before receiving the start information (A25), the MFP 1 may send the start screen data to the said another mobile terminal as well. In such a case, the MFP 1 stores the information indicating that the mobile input function is being provided once the MFP 1 receives the start information from one terminal (B11), and therefore determines that the mobile input function is being provided even though the MFP 1 receives the start information from the other terminal and executes B21. The MFP 1 may send the termination screen data to the other terminal once the MFP 1 receives the start information from one terminal.

After displaying the screen on the touch panel 131 for the particular display time in B19, or after sending the provision-in-progress screen data to the mobile terminal 2 in B21, the MFP 1 terminates the start procedure and the access reception procedure (see FIG. 5), and goes back to S102 in FIG. 2A.

Figure 13:
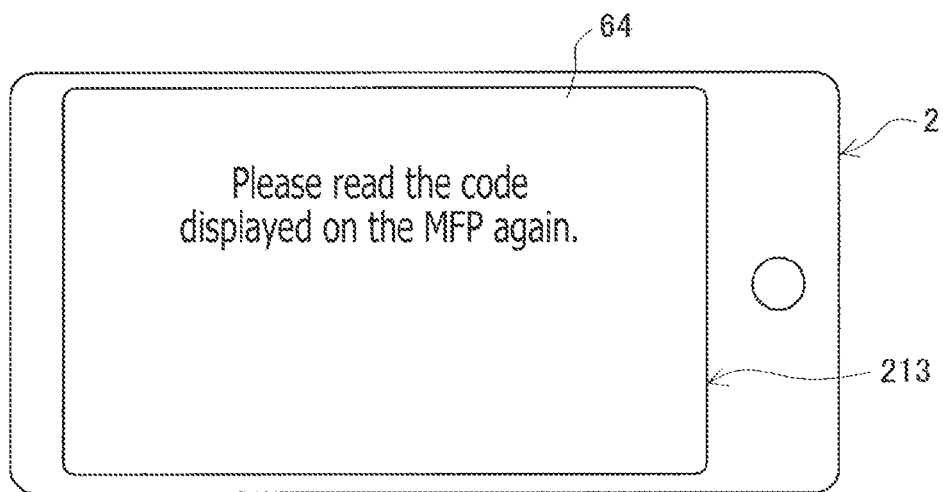
FIG. 13 shows an example of a re-reading screen.

Next, an explanation will be provided of a procedure when an access using access information that is not the latest one has been accepted. When determining, as a result of checking in A12, that the key included in the access information used when the access was accepted does not match the latest key 26 stored in the memory 12 (alt: [NG]), the MFP 1 sends re-reading screen data to the mobile terminal 2 (A31). The re-reading screen data is web page data representing a re-reading screen for requesting the mobile terminal 2 to perform re-reading. Thereby, the browser 213 of the mobile terminal 2 displays on the touch panel 211 a re-reading screen 64, for instance, as shown in FIG. 13 (A32). The re-reading screen 64 includes a message that makes a request for re-reading the standby screen 51 displayed on the touch panel 131 of the MFP 1. After sending the re-reading screen data in A31, the MFP 1 terminates the access reception procedure shown in FIG. 5 and goes back to S102 in FIG. 2A.

The MFP 1 does not provide the mobile input function when the key included in the received access information is not the latest one. By accepting only the access using the access information displayed on the touch panel 131 of the MFP 1 at that time, it is possible to increase the possibility that the access is from the mobile terminal 2 of a user who is now near the MFP 1 and ensure higher security for the mobile input function. In addition, when having received the access using access information that is not the latest one, the MFP 1 provides, via the mobile terminal 2, a notification that there is a need for re-entering the access information, thereby avoiding user's confusion. The notification may be provided together with voice guidance.

As will be described below, in the function provision process shown in FIGS. 2A and 2B, for instance, each time a particular refresh time has elapsed, the CPU 11 of the MFP 1 generates a new key and displays the standby screen 51 including the new key. For instance, if a long time has elapsed since the user caused the mobile terminal 2 to read the two-dimensional code image 511 displayed on the touch panel 131 of the MFP 1 until the user provides an instruction to cause the mobile terminal 2 to access the MFP 1, the MFP 1 may have re-generated a key. In such a case, the MFP 1 determines that the key included in the access information used for the access is not the latest one, and executes A31 in FIG. 5. When accepting the access using the access information that does not include the latest key, the MFP 1 provides a notification that there is a need for re-entering the access information, without sending the start screen data or operation screen data. Thereby, it is highly likely that it is possible to avoid, for instance, a malicious user from reading the two-dimensional code image 511 to operate the MFP 1 from a location away from the MFP 1.

The user who has seen the re-reading screen 64 may access the MFP 1 using the access information with the latest key added, by reading the two-dimensional code image 511 again, for instance, with the camera 212. When accepting the access using the access information with the latest key added, the MFP 1 makes a determination of "OK" in A12 (see FIG. 5) and allows the user to use the mobile input function on the mobile terminal 2.

Even if the MFP 1 does not receive the start information within a particular waiting time after sending the start screen data in A21, the MFP 1 may send to the mobile terminal 2 screen data indicating that the provision of the mobile input function has been terminated, and may not start providing the mobile input function.

Hereinabove, the operations by the MFP 1 when the MFP 1 does not provide the mobile input function have been described. Next, an explanation will be provided of operations by the MFP 1 when the MFP 1 has not received access from the mobile terminal 2 (S121: No) while displaying the standby screen 51. It is noted that a process in a case where the MFP 1 has accepted an operation to the "Exit" button 512 on the standby screen 51 after sending the start screen data in A21 will be described later.

When the MFP 1 has not received access using the access information (S121: No) after having displayed the standby screen 51 in S116 (see FIG. 2A), the CPU 11 determines whether an operation to the "Exit" button 512 has been accepted (S128). When determining that an operation to the "Exit" button 512 has been accepted (S128: Yes), the CPU 11 displays the home screen 53 on the touch panel 131 (S129).

After having displayed the home screen 53 in S129, the MFP 1 is enabled to accept an operation to each object being displayed on the home screen 53. The CPU 11 determines whether an operation to the operation panel 13 has been accepted (S131). When determining that an operation to the operation panel 13 has been accepted (S131: Yes), the CPU 11 performs corresponding operation(s) based on the accepted operation. For instance, when the accepted operation is an operation to change the display screen (S132: Yes), the CPU 11 displays the changed screen on the touch panel 131 (S133). Specifically, for instance, when the "Copy" button is operated, the CPU 11 displays the aforementioned copy screen.

The screen displayed in S133 may be a screen configured to accept parameter setting instructions. When the operation accepted on the screen being displayed is an operation to provide a parameter setting instruction (S134: Yes), the CPU 11 sets a parameter (S135) and displays on the touch panel 131 a screen after the parameter has been set (S136). The process in S135 is substantially the same process as in S225 of FIG. 10B. For instance, the CPU 11 sets a parameter, such as the number of copies, according to the operation accepted via the copy screen displayed in S133, and displays the copy screen updated on which the number of copies has been changed to the set parameter.

When the accepted operation is an operation to provide an instruction to perform image formation (S137: Yes), the CPU 11 causes the print engine 15 and/or the image scanner 16 to perform image formation (S138) and displays the in-execution screen on the touch panel 131 (S139). For instance, when the execution instruction button for copying has been operated via the copy screen displayed in S133, the CPU 11 displays a screen including a message "Copying is in execution" on the touch panel 131. The process in S138 is substantially the same process as in S228 of FIG. 10B. When the accepted operation is an operation other than the operation to provide an instruction to perform image formation (S137: No), the CPU 11 performs a corresponding operation, other than image formation, according to the accepted operation, and then goes back to S131.

In response to accepting an operation to the "Exit" button 512 included in the standby screen 51, the MFP 1 displays the home screen 53 on the touch panel 131. The MFP 1 is then enabled to accept input operations from the operation panel 13. Thereby, even though the MFP 1 is configured to accept input operations from the mobile terminal 2, the MFP 1 is enabled to accept input operations from the operation panel 13 as needed, thereby suppressing deterioration of operability. Such a configuration is user-friendly for users who wish to perform input operations from the operation panel 13.

When determining whether an operation to an object being displayed has not been accepted (S131: No), the CPU 11 determines whether the particular no-operation time (i.e., a particular continuous time during which there is no operation accepted) has elapsed (S140). The CPU 11 does not determine whether the no-operation time has elapsed, while the in-execution screen is being displayed on the touch panel 131. The CPU 11 determines whether the no-operation time has elapsed since a screen (e.g., the copy screen) different from the in-execution screen began to be displayed. For instance, the particular no-operation time is one minute. When determining that the no-operation time has not elapsed (S140: No), the CPU 11 waits until either an operation to an object being displayed is accepted or the no-operation time elapses.

When determining that the no-operation time has elapsed with no operation accepted (S140: Yes), the CPU 11 goes back to S102 in substantially the same manner as after completion of the access reception procedure in S122.

When the target screen to be displayed in S133 is the home screen 53, the CPU 11 proceeds to S102 instead of displaying the home screen 53, as indicated by a dashed line in FIG. 2B. Then, when the mobile input function is valid, the CPU 11 executes S111 to S116 to display the standby screen 51. Meanwhile, when the mobile input function is invalid, the CPU 11 proceeds to S105 to display the home screen 53. In another instance, the CPU 11 may display the home screen 53 to accept operations even if the target screen to be displayed in S133 is the home screen 53. In this case, the CPU 11 may proceed to S102 when there has been no user operation for more than the no-operation time.

When the mobile input function is valid, the screen displayed on the touch panel 131 based on the operation to the "Exit" button 512 may include a button to accept an instruction to terminate the operation to the touch panel 131. In that case, in response to acceptance of an operation to that button, the CPU 11 may proceed to S102. Meanwhile, in response to acceptance of an instruction other than the operation to that button, the CPU 11 may perform a corresponding operation based on the user operation (e.g., may display the home screen 53 when accepting an instruction to display the home screen 53).

As described above, the standby screen 51 is still displayed on the touch panel 131 after transmission of the start screen data in A21. When determining that an operation to the "Exit" button 512 has been accepted on the standby screen 51 (see FIG. 4) (alt: [Exit], A27), the MFP 1 sends the termination screen data to the mobile terminal 2 which is also a transmission destination for the start screen data (A28), and proceeds to S129 in FIG. 2A. The process in A28 is substantially the same process as in B16 (see FIG. 7). Thereby, the termination screen as shown in FIG. 11 is displayed on the touch panel 211 of the mobile terminal 2 (A29).

Thus, the MFP 1 is configured to accept an operation to the "Exit" button 512 even after sending the start screen data. Therefore, the user is allowed to perform both providing an instruction to start using the mobile input function from the mobile terminal 2 and providing an instruction to not use the mobile input function from the operation panel 13. Further, the operation to the "Exit" button 512 makes it easy to switch between performing input operations to the MFP 1 from the mobile terminal 2 and performing input operations to the MFP 1 from the operation panel 13. Such a configuration is user-friendly for both users who wish to perform input operations from the mobile terminal 2 and users who wish to perform input operations from the operation panel 13.

After returning to S102 in FIG. 2A, the MFP 1 executes S111-S116 again when the mobile input function is valid. Namely, when the provision of the mobile input function has been terminated, when the re-reading screen data has been sent, or when no operation has been accepted for more than the no-operation time since the "Exit" button 512 was operated, the CPU 11 generates a standby screen 51 including a new key and automatically displays the generated standby screen 51 on the touch panel 131. When the mobile input function is not valid, the CPU 11 proceeds to S105 to display the home screen 53. Such a configuration is less disadvantageous for both users who wish to use the mobile input function and users who do not.

By generating a new standby screen 51, the MFP 1 is enabled to accept both an input operation from the mobile terminal 2 and an operation to the "Exit" button 512. The MFP 1 may not generate a new key immediately after sending the re-reading screen data in A31 of FIG. 5. The CPU 11 may not make a determination on the validity information 25 at any time except when the MFP 1 is started up.

In the first illustrative embodiment, after the provision of the mobile input function has been terminated (e.g., when a long press operation to the back key 133 has been accepted during the provision of the mobile input function, the MFP 1 automatically displays a new standby screen 51 without waiting until the no-operation time elapses in S140. This makes it easier for a next user, who wants to use the mobile input function immediately, to use the mobile input function.

Moreover, the MFP 1 generates access information including a new key each time the provision of the mobile input function is terminated, and does not start providing the mobile input function even if there is an access using previous access information. Namely, a user who wants the MFP 1 to start providing the mobile input function again will have to, via the mobile terminal 2, read the standby screen 51 again and re-enter the access information. Thereby, it is possible to increase the possibility that the access is from the mobile terminal 2 of the user who is now in front of the MFP 1 and to ensure higher security for the mobile input function.

As described above, when the MFP 1 has started providing the mobile input function, and then terminates the mobile input provision process (B15 in FIG. 7) in response to receiving an instruction to terminate the provision of the mobile input function, the MFP 1 displays on the touch panel 131 the screen corresponding to the stored screen ID for the particular display time (B19). The particular display time is shorter than the no-operation time, which is a time during which the screen to accept operations is displayed after an operation to the "Exit" button 512 is accepted. The operation to the "Exit" button 512 is highly likely to be a clear intention of the user who wants to stop displaying the standby screen 51 and operate the touch panel 131. When having accepted the operation to the "Exit" button 512, the MFP 1 displays the screen to accept operations for a period of time that is longer than the display time after the termination of the mobile input function. Therefore, it is possible for the MFP 1 to easily accept user operations.

In addition, when the MFP 1 has terminated the access reception procedure in response to accepting the operation to the "Exit" button 512 in A27 of the access reception procedure (see FIG. 5), the MFP 1 displays on the touch panel 131 the screen to accept user operations and is enabled to accept user operations, in substantially the same manner as when the MFP 1 makes the affirmative determination in S128 (S128: Yes). Then, the MFP 1 makes the same determinations as in S131 and S140. It is noted that the no-operation time in this case does not need to be the same time as in S140. The MFP 1 is configured to accept an operation to the "Exit" button 512 even after sending the start screen data (A21 in FIG. 5). Thereby, a user, different from the user who accessed the MFP 1 from the mobile terminal 2, is allowed to use the MFP 1, thereby increasing the utilization rate of the MFP 1.

On the other hand, after having displayed the standby screen 51 in S116, when determining that neither an access from an external device (e.g., the mobile terminal 2) nor an operation to the "Exit" button 512 has been received (S121: No, and S128: No), the CPU 11 determines whether the particular refresh time has elapsed (S141). When determining that the refresh time has elapsed (S141: Yes), the CPU 11 goes back to S102 and displays a new standby screen 51.

The refresh time is an elapsed time until a key is regenerated with no user access or user operation accepted. For instance, the refresh time is 5 minutes. Thus, the MFP 1 is configured to regenerate a key as appropriate after a lapse of the particular refresh time. Thereby, the MFP 1 does not accept any access using old access information for which the refresh time has elapsed.

When determining that the refresh time has not elapsed (S141: No), the CPU 11 repeatedly makes the determination of S121, S128 and S141 until the MFP 1 is powered off (S142: No). In the first illustrative embodiment, the MFP 1 is configured to, while displaying the standby screen 51, only accept either an access from the mobile terminal 2 or an operation to the "Exit" button 512, and not accept other operations such as a long press operation to the back key 133 (see FIG. 4). Accordingly, it is possible to avoid the mixing of input operations from the mobile terminal 2 and input operations via the operation panel 13, thereby achieving stabilized control of the MFP 1. When the MFP 1 is powered off (S142: Yes), the CPU 11 terminates the function provision process.

When the MFP 1 has accepted no user access or user operation for more than the particular sleep time, the MFP 1 may put the operation panel 13 into a sleep state to stop displaying on the touch panel 131. In that case, in response to accepting some operation to the operation panel 13 in the sleep state, the MFP 1 may perform the function provision process based on the determination in S102.

Figure 14:
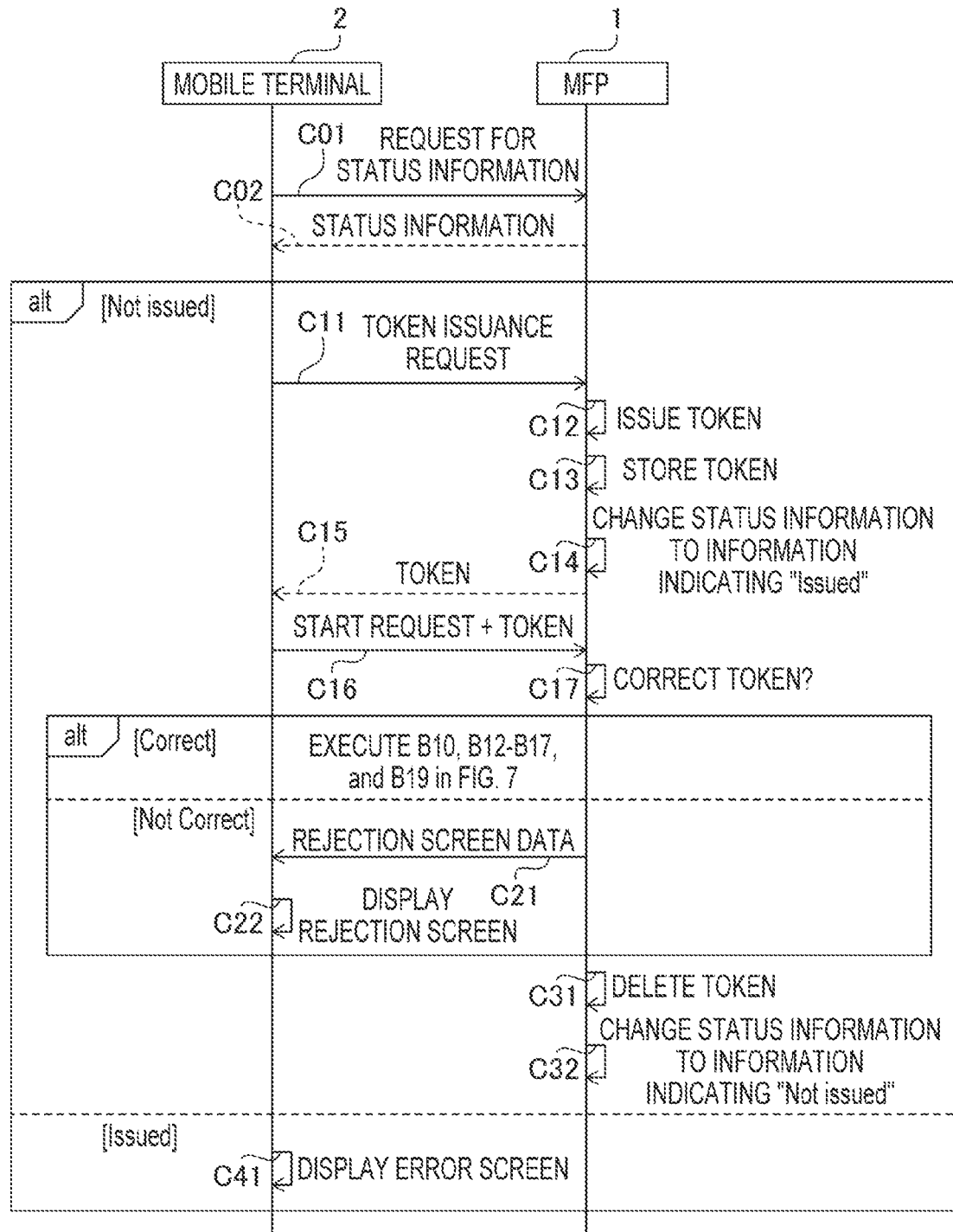
FIG. 14 is a sequence chart showing an example of a second start procedure.

Subsequently, a second start procedure will be described with reference to a sequence chart shown in FIG. 14. The second start procedure is another procedure to determine whether the mobile input function is being provided. The second start procedure is performed in place of the start procedure shown in FIG. 7.

Figure 5:
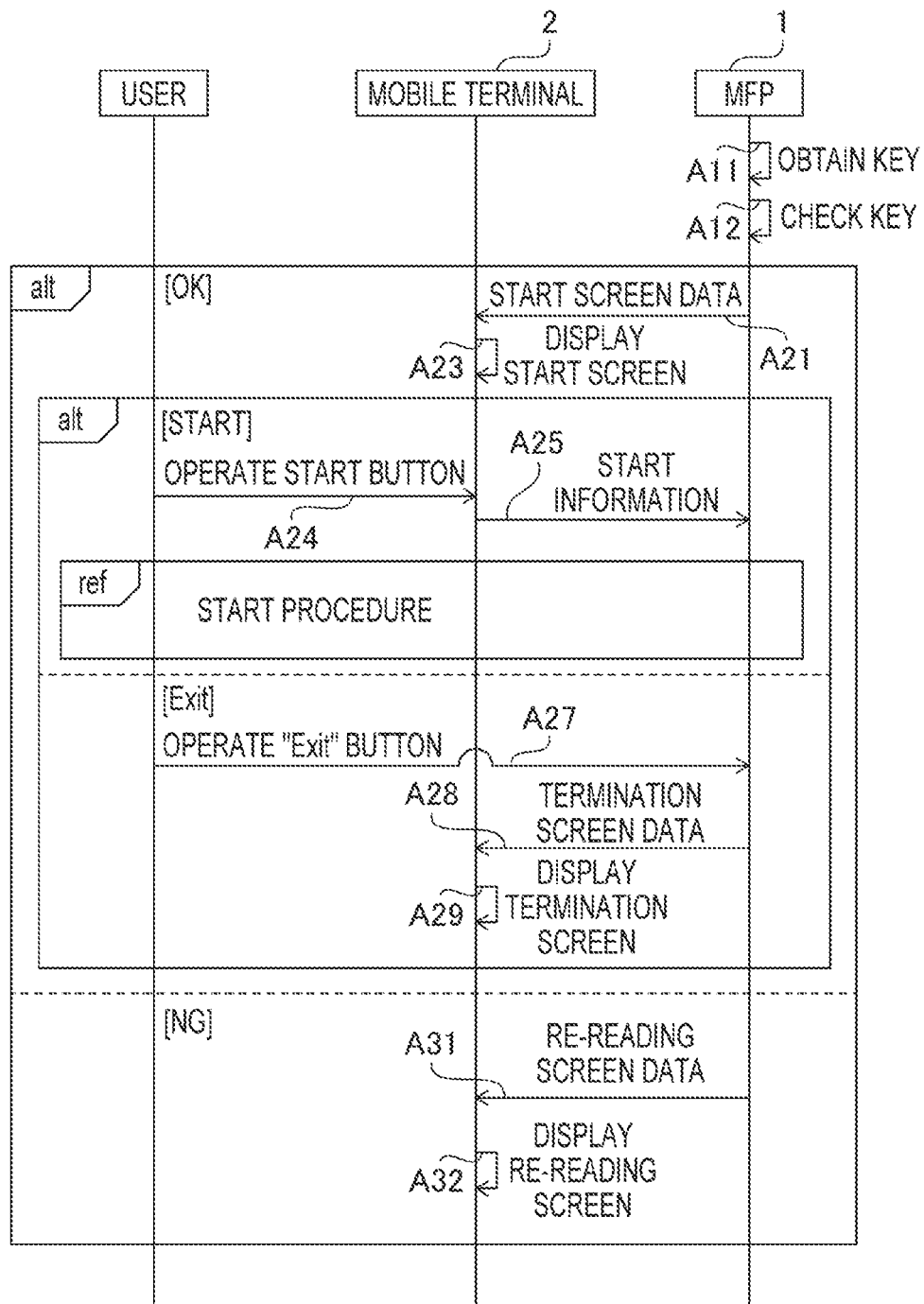
FIG. 5 is a sequence chart showing an example of an access reception process.

The MFP 1, executing the second start procedure, sends data including a program to be executed by the browser 213 of the mobile terminal 2, as the start screen data to be sent to the mobile terminal 2 in A21 of FIG. 5. For instance, this program is described in JavaScript ("JavaScript" is a registered trademark of ORACLE AMERICA, INC.). In response to receiving the start screen data including the program, the mobile terminal 2 operates according to the received program.

Based on the received start screen data, the mobile terminal 2 displays the start screen 61 shown in FIG. 6. Then, in response to accepting an operation to the start button 611, the mobile terminal 2 sends to the MFP 1 a request for status information indicating an issue status of token (C01), as shown in FIG. 14. The MFP 1 sends the status information in response to the request from the mobile terminal 2 (C02). The status information indicates whether the token has been issued. Namely, the status information indicates either "Issued" or "Not issued." When the token has never been issued (e.g., when the MFP 1 is started up), the MFP 1 sets the status information to "Not issued."

When the status information received from the MFP 1 indicates "Not issued," the mobile terminal 2 sends a token issuance request to the MFP 1 (C11). The MFP 1 issues a token in response to the token issuance request sent by the mobile terminal 2 in C11 (C12), and then stores the issued token in the memory 12 (C13). The MFP 1 may store the issued token by overwriting a previous token, or may store the issued token with additional information indicating that it is the latest token. Moreover, the MFP 1 may store the token with additional time information indicating a period of time during which the token is usable. The MFP 1 may check the issue status of token again before C12. Furthermore, the MFP 1 changes the status information indicating the issue status of token to information indicating "Issued" (C14).

Then, the MFP 1 sends the issued token to the mobile terminal 2 (C15). In response to receiving the token, the mobile terminal 2 sends a start request and the received token to the MFP 1 (C16). The start request includes information for making a request to start using the mobile input function. The MFP 1 determines whether the token received with the start request is a correct token that matches the latest token stored in C13 (C17).

When determining that the received token is a correct token (alt: [Correct]), the MFP 1 executes the steps B10, B12-17, and B19 in substantially the same manner as the start procedure shown in FIG. 7. Thus, as the MFP 1 has started providing the mobile input function, the user is allowed to operate the MFP 1 using the mobile terminal 2. In the second start procedure, however, on every occasion to send operation data based on a user operation in the mobile input provision process, the mobile terminal 2 sends the operation data with a token added. The MFP 1 checks whether the token received with the request is correct by comparing the received token with the token stored in the memory 12. When determining that the received token is correct, the MFP 1 performs a process based on the operation data and sends new screen data. Meanwhile, when determining that the received token is not correct, the MFP 1 may immediately terminate the mobile input provision process.

When determining that the token received with the start request is not correct (alt: [Not correct]), the MFP 1 sends to the mobile terminal 2 rejection screen data indicating that the MFP 1 will not start providing the mobile input function (C21). The mobile terminal 2 displays on the touch panel 131 a rejection screen based on the received rejection screen data (C22). After the provision of the mobile input function has been terminated or after C21, the MFP 1 deletes the token stored in C13 (C31), and changes the status information to information indicating "Not issued" (C32).

On the other hand, when having received the status information indicating "Issued" in CO2, the mobile terminal 2 displays an error screen on the touch panel 211 (C41). In addition, the mobile terminal 2 also displays the error screen when a token has not been issued within a particular time or the mobile terminal 2 has received issuance error information in response to the token issuance request sent to the MFP 1 in C11.

In this way as well, the MFP 1 may determine whether the mobile input function is being provided to another terminal, based on the issue status of token. In another instance, the mobile terminal 2 may send the token issuance request, which is to be sent in C11 in the aforementioned example, instead of obtaining the status information in C01. In that case, the MFP 1 may determine whether a token has been issued in response to receiving the token issuance request. When determining that a token has been issued, the MFP 1 may send the rejection screen data in substantially the same manner as in C21.

As described in detail above, the MFP 1 of the first illustrative embodiment has the mobile input function. Therefore, the MFP 1 is enabled to accept input operations from the mobile terminal 2. Prior to starting to provide the mobile input function, the MFP 1 displays the two-dimensional code image 511 on the touch panel 131 of the operation panel 13. The two-dimensional code image 511 contains the access information necessary for causing the MFP 1 to start the mobile input function. Thereby, even though the user does not remember the access information, the user is allowed to easily input the access information by reading the two-dimensional code image 511 in front of the MFP 1 with the mobile terminal 2, and to easily use the mobile input function.

Figure 15:
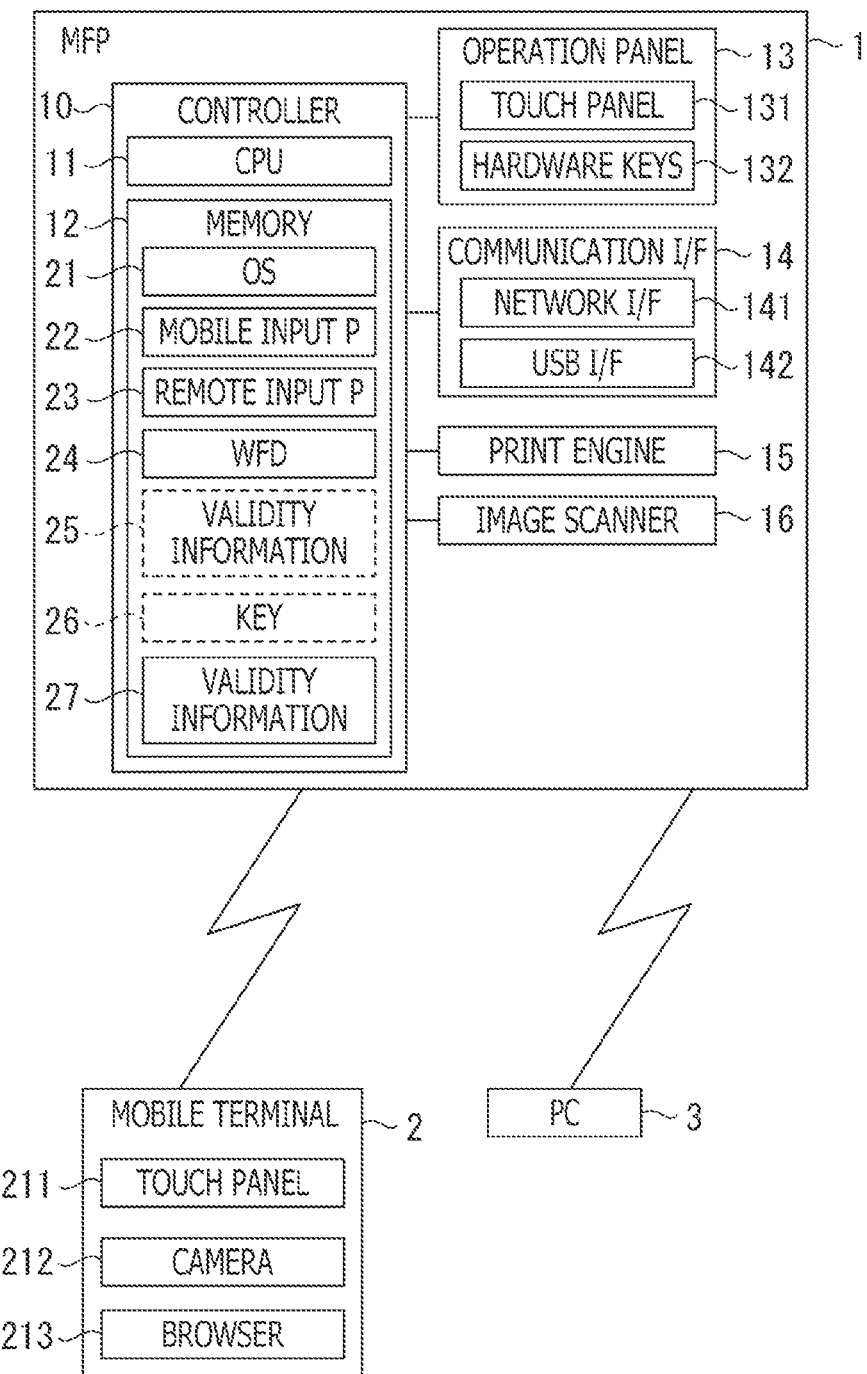
FIG. 15 is a block diagram schematically showing a configuration of an MFP.

Subsequently, an MFP of a second illustrative embodiment will be described in detail with reference to the accompanying drawings. As shown in FIG. 15, in addition to the elements included in the MFP 1 of the aforementioned first illustrative embodiment, an MFP 101 of the second illustrative embodiment has a remote input function program (hereinafter referred to as a "remote input P") 23, and a function (hereinafter referred to as a "WFD") 24 to become a group owner of Wi-Fi Direct ("Wi-Fi DIRECT" is a registered trademark of Wi-Fi Alliance). A remote input function provided by the remote input P 23 is a function to accept remote operations by using an embedded web server function of the MFP 101, and is different from the mobile input function. With respect to the other elements than the above configuration, they are substantially the same as those of the MFP 1 in the aforementioned first illustrative embodiment. Hence, the same reference characters will be attached to them, and detailed explanations of them may be omitted.

The MFP 101 of the second illustrative embodiment has the WFD 24. Therefore, the MFP 101 is enabled to provide a network using the WFD 24. The WFD 24 is a function in which the MFP 101 becomes the group owner and establishes communication with a client device using the same communication standards as Wi-Fi to perform one-to-one wireless communication. A particular SSID and a particular password are assigned to the WFD 24 of the MFP 101. The client device is allowed to communicate with the MFP 101 via the network provided by the WFD 24 by specifying the SSID and the password. There may be a plurality of methods for establishing the communication with the WFD 24. In this case, the client device may select one of the methods, for instance, according to its functions.

In the second illustrative embodiment, it is assumed that the MFP 101 may accept requests not only from devices such as the mobile terminal 2 having the camera 212 but also from devices such as a personal computer (hereinafter referred to as a "PC") 3 configured to send a request from remote locations via the Internet. The MFP 101 is configured to accept requests through any communication path of a direct connection using the WFD 24 and a wired or wireless network connection via an access point.

The MFP 101 of the second illustrative embodiment has both the mobile input P 22 and the remote input P 23. Therefore, the MFP 101 has access information for the mobile input P 22 and access information for the remote input P 23. Thus, the MFP 101 is enabled to provide the mobile input function or the remote input function according to the access information of the accepted access. The mobile input P 22 and the remote input P 23 may be provided by using in common the same embedded web server function or by using respective separate embedded web server functions.

Further, the MFP 101 is configured to accept a setting instruction for validity information 27 indicating whether the remote input function is valid, as well as the setting instruction for the validity information 25 indicating whether the mobile input function is valid. For instance, the MFP 101 accepts the setting instruction for the validity information 27 via the USB I/F 142. In response to accepting an input of the validity information 27, the MFP 101 stores the validity information 27 in a non-volatile storage area of the memory 12, as shown in FIG. 15. It is noted that the MFP 101 may be configured to accept the setting instruction for the validity information 27 via the network I/F 141, for instance, if the setting instruction is given by a user having an administrator right.

Thus, since the user is allowed to individually set information as to whether to validate the mobile input function and information as to whether to validate the remote input function, it is possible to achieve improved user-friendliness. Further, by limiting from where the validity information 27 is input, for instance, to from a USB memory in substantially the same manner as the validity information 25, it is possible to restrict immoderate changes of the validity information 27.

However, the MFP 101 does not enable the remote input function when the validity information 25 is stored in the memory 12 and the mobile input function is valid. In this case, for instance, the MFP 101 may be configured to not accept the setting instruction for the validity information 27 when the mobile input function is valid. In another instance, the MFP 101 may be configured to, even when accepting the setting instruction for the validity information 27 in the case where the mobile input function is valid, not store the validity information 27, thereby not enabling the remote input function. Further, the MFP 101 may be configured to, when accepting the setting instruction for the validity information 25 in a case where the validity information 27 is stored in the memory 12 and the remote input function is valid, delete the validity information 27 and disable the remote input function. The MFP 101 may be configured to display a setting screen to accept only a selected one of two options, i.e., an option to set the mobile input function valid and an option to set the remote input function. In this case, the MFP 101 may set only the function corresponding to the selected option as valid. In addition, each selectable option may be displayed with a corresponding radio button on the setting screen. The MFP 101 may be configured to cause the web server provided by the MFP 101 to send web page data of a setting page to the requesting device that has accessed the MFP 101. In this case, the MFP 101 may set the mobile input function or the remote input function valid in accordance with an instruction accepted via the setting page displayed on the requesting device that has received the web page data. At the time of shipping of the MFP 101, neither the mobile input function nor the remote input function may be activated. Namely, in this case, neither the mobile input function nor the remote input function is allowed to be set valid. Further, in this case, the MFP 101 may be configured to, as instructed, activate the mobile input function and the remote input function, and thereafter set the mobile input function or the remote input function valid. The vendor of the MFP 101 may offer a service of activating the mobile input function and the remote input function as a paid service. The mobile input function and the remote input function may be activated as instructed (e.g., in response to an activating command being input into the MFP 101). The activating command may be input into the MFP 101 via the communication I/F 14 or the operation panel 13. In another instance, the activating command may be input into the MFP 101 in response to a USB memory storing the activating command being attached to the MFP 101.

The MFP 101 has the mobile input P 22. Therefore, when started up, the MFP 101 performs substantially the same process as the aforementioned function provision process (see FIGS. 2A and 2B) by the MFP 1 in the first illustrative embodiment. Specifically, when the mobile input function is valid (S102: Yes in FIG. 2A), the MFP 101 displays a standby screen including the access information on the touch panel 131 (S111-S116 in FIG. 2A) to be ready to receive access from an external device. In the following description, an external device that has accessed the MFP 101 and sent a request may be referred to as a "requesting device."

Figure 16:
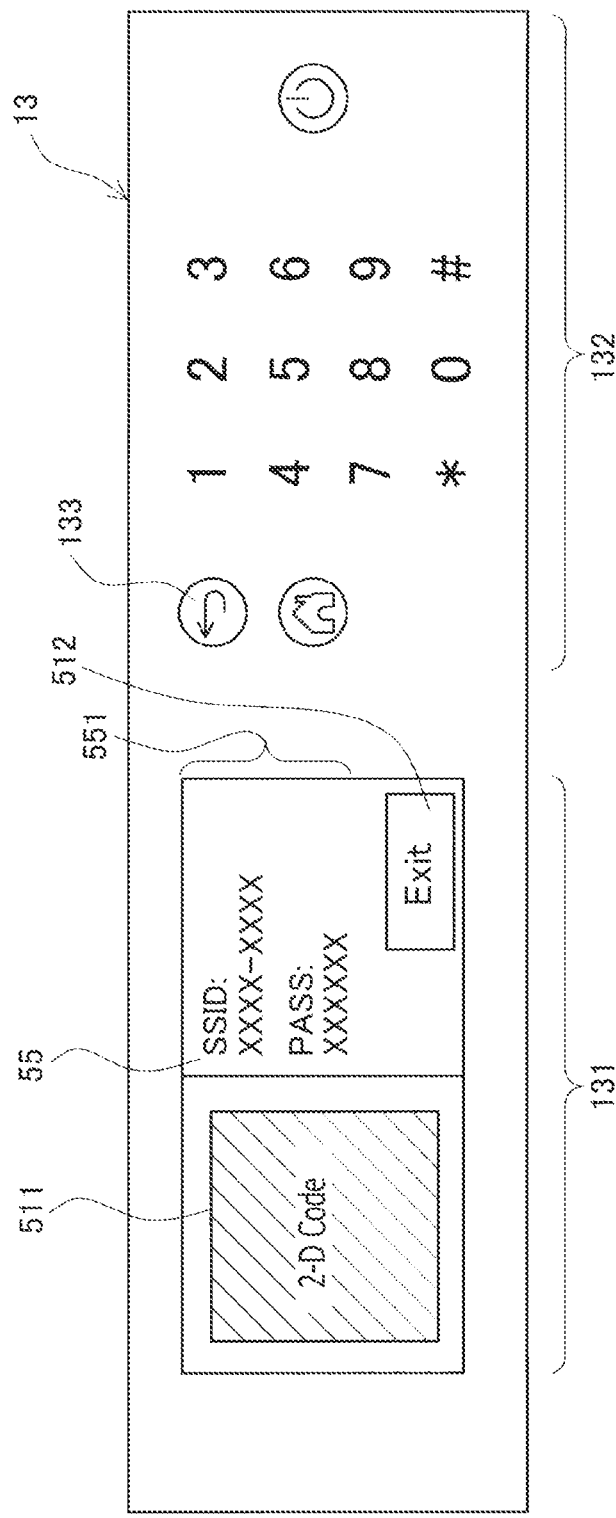
FIG. 16 shows an example of a standby screen.

However, as will be described below, the MFP 101 of the second illustrative embodiment is enabled to provide the mobile input function only when the MFP 101 accepts access via the WFD 24. Therefore, as shown in FIG. 16, the MFP 101 displays a standby screen 55 including connection information 551 on the touch panel 131. The connection information 551 is for establishing communication with the WFD 24. The standby screen 55 includes a two-dimensional code image 511, an "Exit" button 512, and the connection information 551. The two-dimensional code image 511 is access information for making a request to start providing the mobile input function. The connection information 551 is information on the particular SSID and the particular password that are assigned to the WFD 24. Displaying the standby screen 55 including the two-dimensional code image 511 and the connection information 551 enables even users who do not remember these pieces of information to easily use the mobile input function.

Figure 17:
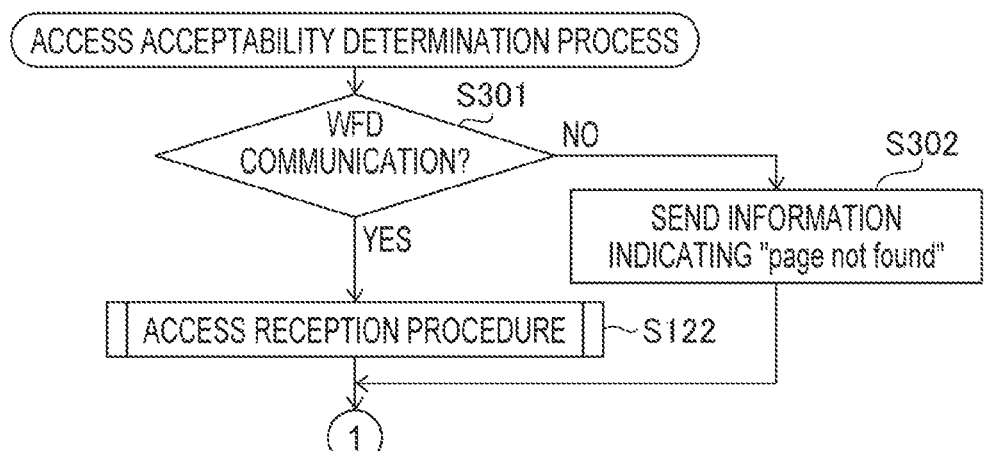
FIG. 17 is a flowchart showing a procedure of an access acceptability determination process.

When having received access using the access information for the mobile input P 22, e.g., from the mobile terminal 2 (S121: Yes in FIG. 2A) while the standby screen 55 is being displayed, the MFP 101 performs an access acceptability determination process before performing the access reception procedure (see FIG. 5) in the aforementioned first illustrative embodiment. A procedure of the access acceptability determination process will be described with reference to a flowchart shown in FIG. 17.

In the access acceptability determination process, the CPU 11 determines whether the communication path through which the request (i.e., the access to the mobile input function) has been received is communication via the WFD 24 (S301). The MFP 101 is enabled to accept an instruction to establish communication with the WFD 24, irrespective of the mobile input function and the remote input function.

When determining that the access to the mobile input function has been received via the WFD 24 (S301: Yes), the CPU 11 performs the access reception procedure (see FIG. 5) (S122) in substantially the same manner as in the aforementioned first illustrative embodiment. Specifically, the MFP 101 checks the key included in the access information used for the access (A12 in FIG. 5). Then, when determining that the key is the latest one, the MFP 101 sends the start screen data (A21 in FIG. 5) and becomes ready to provide the mobile input function.

Meanwhile, when determining that access to the mobile input function has been received via a communication path other than the WFD 24 (S301: No), the CPU 11 sends information indicating "404 page not found" to the requesting device (S302). Thereafter, the CPU 11 terminates the access acceptability determination process. The "404 page not found" is information that the web server provides to the browser when there is no web page corresponding to the received request. In response to receipt of the information sent in S302 by the MFP 101, the browser of the requesting device displays a screen corresponding to the information indicating "404 page not found." For instance, the information sent in S302 may be screen data representing a screen to reject the request.

After S302 or after the termination of the access reception procedure, the CPU 11 goes back to S102 (see FIG. 2A) of the function provision process and displays the standby screen 55 again.

On the other hand, when the mobile input function is not valid, the MFP 101 displays a main unit operation screen (e.g., the home screen 53) configured to accept operations on the touch panel 131 instead of the standby screen 55 (see S105 in FIG. 2A) through substantially the same processing as the negative determination in S102 (S102: No in FIG. 2A) in the function provision process of the aforementioned first illustrative embodiment. Thereby, the MFP 101 is enabled to accept operations to the touch panel 131. The main unit operation screen may be referred to as a "local operation screen."

When the mobile input function is not valid, the MFP 101 accepts an operation to switch between the valid and invalid statuses of the remote input function. When having received access using the access information for the remote input P 23 in a state where the remote input function is invalid, the MFP 101 sends, to the requesting device, web page data representing a screen to provide a notification that the remote input function is invalid. Meanwhile, when having received access using the access information for the remote input P 23 in a state where the remote input function is valid, the MFP 101 may provide the remote input function even while accepting operations to touch panel 131.

Unlike in the case of the mobile input function, the MFP 101 does not display on the touch panel 131 the access information that makes a request to start providing the remote input function. Therefore, the accesses to request the MFP 101 to provide the remote input function are limited to accesses from users who know how to access the MFP 101 without having to rely on the access information. Thus, it is possible to avoid immoderate remote operations.

Figure 18:
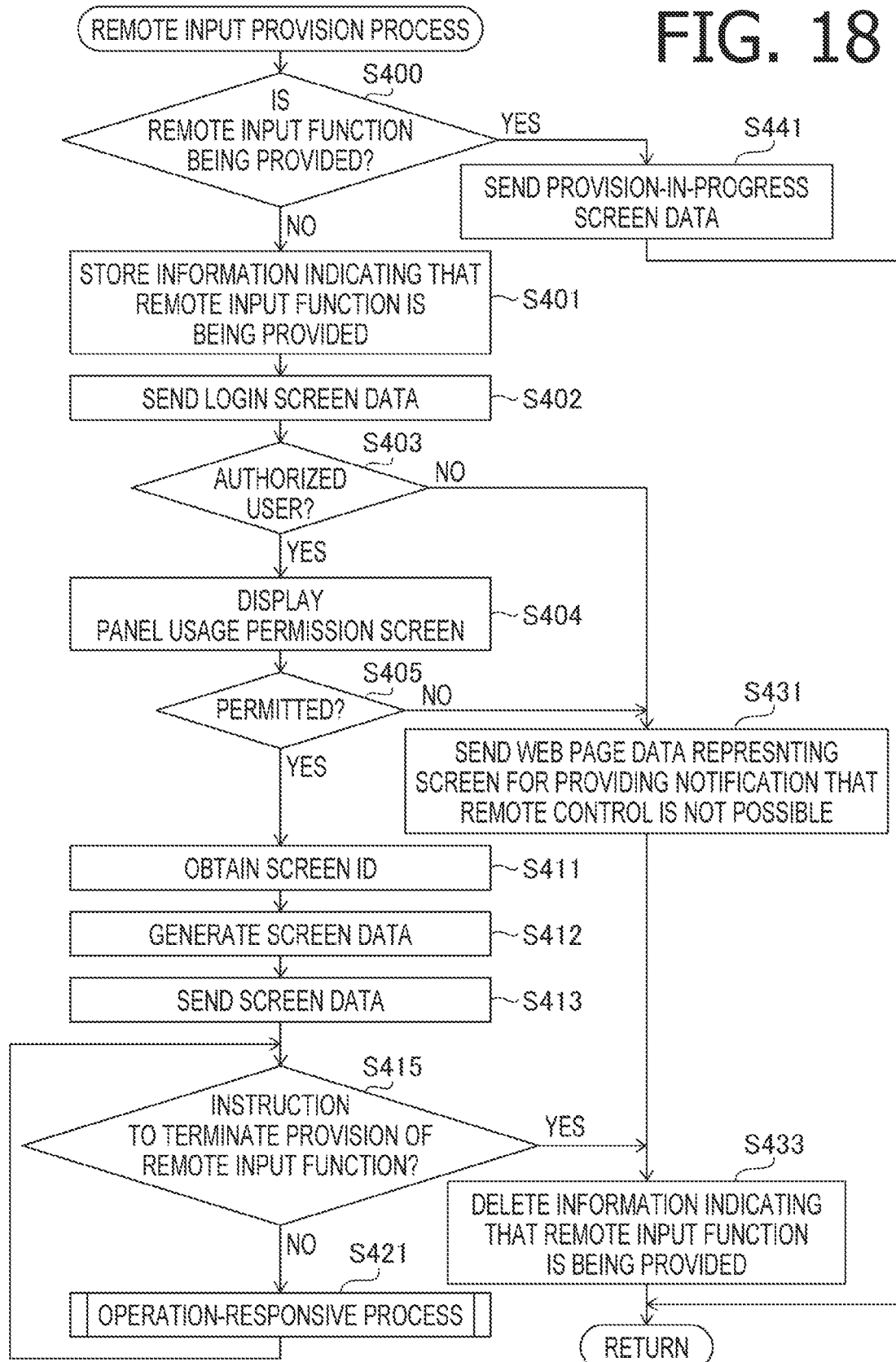
FIG. 18 is a flowchart showing a procedure of a remote input provision process.

When having received access using the access information for the remote input P 23 with the validity information 27 stored in the memory 12, the MFP 101 performs a remote input provision process based on the remote input P 23. A procedure of the remote input provision process will be described with reference to a flowchart shown in FIG. 18. It is noted that when the received access is for making a request for a web page for the remote input function, the MFP 101 does not make the determination in S301 (see FIG. 17). Namely, the MFP 101 may accept the access to the remote input function if the request is from a device connected with the network connected with the MFP 101.

In the remote input provision process, the CPU 11 first determines whether the remote input function is being provided (S400). As will be described below, when the CPU 11 starts providing the remote input function, the CPU 11 stores in the memory 12 information indicating that the remote input function is being provided. In S400, the CPU 11 determines whether the information indicating that the remote input function is being provided is stored in the memory 12. The MFP 101 may make the determination as to whether the remote input function is being provided in a procedure using a token such as shown in FIG. 14.

When determining that the remote input function is not being provided (S400: No), the CPU 11 stores in the memory 12 the information indicating that the remote input function is being provided (S401). Then, CPU 11 sends login screen data representing a screen to accept authentication information for login (S402), and receives a request including authentication information from the requesting device. In response to receiving the authentication information, the CPU 11 performs user authentication to determine whether the user who has made a request for the remote input function is authorized to use the remote input function (S403). The remote input function is highly likely to be used by a user who is not near the MFP 101. Thus, the MFP 101 starts providing the remote input function with successful user authentication as a requirement for starting the remote input function, thereby ensuring higher security for the remote input function. The user authentication may be performed by the MFP 101 or an authentication server.

Figure 19:
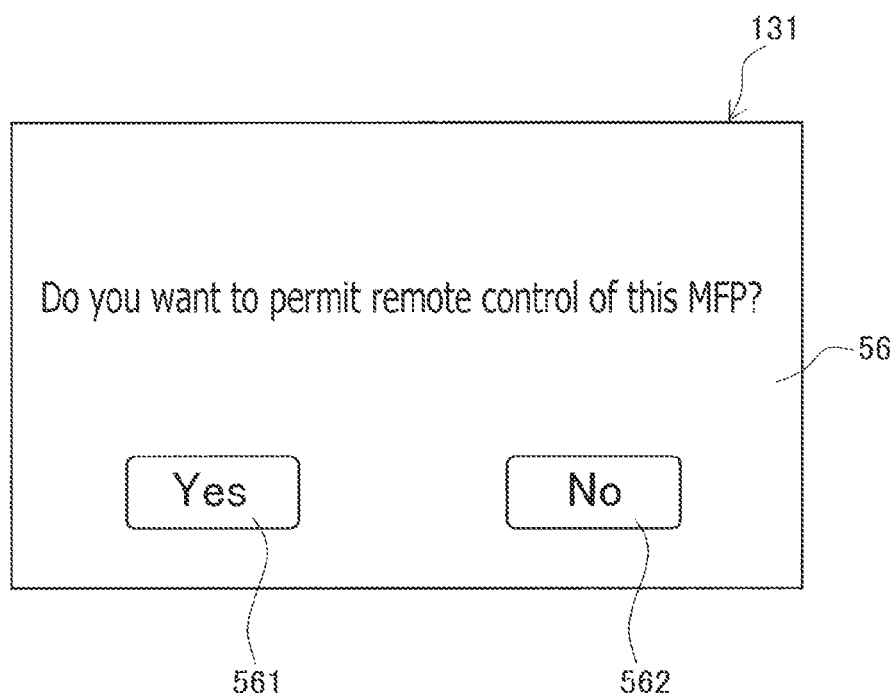
FIG. 19 shows an example of a panel usage permission screen.

When determining that the user is authorized to use the remote input function (S403: Yes), the CPU 11 displays on the touch panel 131 a panel usage permission screen 56, for instance, as shown in FIG. 19 (S404), and accepts a user input (S405). The panel usage permission screen 56 is configured to provide a notification that a request for remote control of the MFP 101 by the remote input function has been made, and to accept a user selection as to whether to start the remote control of the MFP 101. The panel usage permission screen 56 includes a "Yes" button 561 and a "No" button 562. The panel usage permission screen 56 may further include, for instance, a message for providing a notification that an operation to the touch panel 131 will not be accepted once the remote control by the remote input function is started and that a result of the remote control will be reflected on the touch panel 131. It is noted that the CPU 11 does not display the panel usage permission screen 56 when providing the mobile input function in B10 to B15 of FIG. 7.

When determining that the start of the remote input function has been selected by operating the "Yes" button 561 on the panel usage permission screen 56 (S405: Yes), the CPU 11 obtains the screen ID stored in the memory 12 at that time (S411) and generates screen data based on the obtained screen ID (S412). The MFP 101 stores in the memory 12 the screen ID for identifying the screen being displayed on the touch panel 131. Here, the CPU 11 obtains the screen ID indicating the screen immediately before displaying the panel usage permission screen 56. Additionally, the CPU 11 closes the panel usage permission screen 56.

The CPU 11 sends the generated screen data to the requesting device (S413). Thereby, the browser of the requesting device causes the display of the requesting device to display substantially the same screen as the screen that had been displayed on the touch panel 131 of the MFP 101 immediately before the panel usage permission screen 56 was displayed. For instance, when the home screen 53 (see FIG. 3) had been displayed on the touch panel 131 immediately before the panel usage permission screen 56 was displayed, a screen similar to the home screen 62 shown in FIG. 9 is displayed on the display of the requesting device. Furthermore, when having accepted an operation to the screen being displayed, the browser of the requesting device sends to the MFP 101 a request including operation data indicating the accepted operation. Through the web page for the remote input function, the MFP 101 is enabled to accept operation data that represents, for instance, instructions to change various settings, an instruction to perform image formation, and an instruction to terminate the use of the remote input function.

The CPU 11 determines whether the operation data included in the request is operation data indicating an operation to terminate the use of the remote input function (i.e., whether the operation data included in the request indicates an operation to provide an instruction to terminate the provision of the remote input function) (S415). When determining that the operation data included in the request is not operation data indicating an operation to terminate the use of the remote input function (S415: No), the CPU 11 performs an operation-responsive process (S421).

Figure 20:
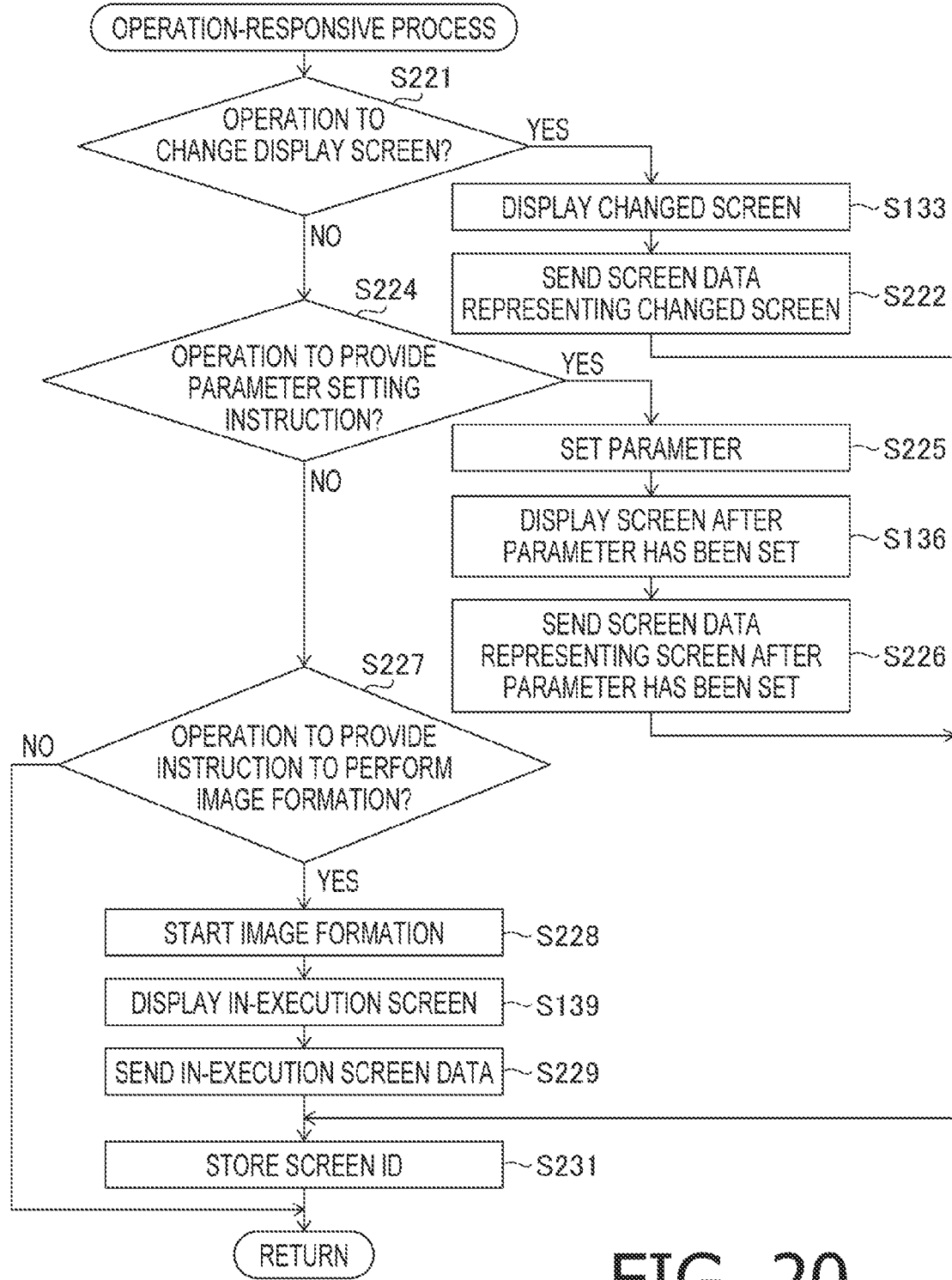
FIG. 20 is a flowchart showing a procedure of an operation-responsive process.

A procedure of the operation-responsive process will be described with reference to a flowchart shown in FIG. 20. In FIG. 20, with respect to substantially the same processes as in FIGS. 2 and 10, the same reference characters are attached to them. In the operation-responsive process, the CPU 11 determines whether the operation data included in the received request indicates an operation to change the display screen (S221). When determining that the operation data included in the received request indicates an operation to change the display screen (S221: Yes), the CPU 11 displays the changed screen on the touch panel 131 (S133), unlike in the case of the mobile input function. Further, in substantially the same manner as in the case of the mobile input function, the CPU 11 sends screen data representing the changed screen to the requesting device (S222).

When determining that the operation data included in the received request does not indicate an operation to change the display screen (S221: No), the CPU 11 determines whether the operation data included in the received request indicates an operation to provide a parameter setting instruction (S224). When determining that the operation data included in the received request indicates an operation to provide a parameter setting instruction (S224: Yes), the CPU 11 sets a parameter, based on the operation data (S225) in substantially the same manner as in the case of the mobile input function.

Further, unlike in the case of the mobile input function, the CPU 11 displays on the touch panel 131 a screen after the parameter is set (S136). Then, in substantially the same manner as in the case of the mobile input function, the CPU 11 sends, to the requesting device, screen data indicating the screen after the parameter is set (S226).

When determining that the operation data included in the received request does not indicate an operation to provide a parameter setting instruction (S224: No), the CPU 11 determines whether the operation data included in the received request indicates an operation to provide an instruction to perform image formation (S227). When determining that the operation data included in the received request indicates an operation to provide an instruction to perform image formation (S227: Yes), the CPU 11 starts executing image formation based on the operation data (S228) in substantially the same manner as in the case of the mobile input function. By using the remote input function, the user is allowed to send setting instructions and execution instructions to the MFP 101 through remote control from the requesting device.

Further, unlike in the case of the mobile input function, the CPU 11 displays on the touch panel 131 a screen indicating that image formation is in execution (S139). Then, in substantially the same manner as in the case of the mobile input function, the CPU 11 sends, to the requesting device, screen data indicating that image formation is in execution (S229).

After any one of the steps S222, S226, and S229, the CPU 11 stores a screen ID for identifying the sent screen data in the memory 12 (S231) in substantially the same manner as in the case of the mobile input function. After S231, or when determining that the operation data included in the received request does not indicate an operation to provide an instruction to perform image formation (S227: No), the CPU 11 terminates the operation-responsive process and goes back to the remote input provision process (see FIG. 18).

Referring back to FIG. 18, a continued explanation of the remote input provision process is provided. After the termination of the operation-responsive process in S421, the CPU 11 is enabled to accept next operation data from the requesting device. Then, the CPU 11 goes back to S415 and again determines whether the operation data included in the request from the requesting device indicates an operation to provide an instruction to terminate the provision of the remote input function.

When determining that the operation data included in the received request is operation data indicating an operation to terminate the use of the remote input function (S415: Yes), the CPU 11 deletes the information, stored in S401, indicating that the remote input function is being provided (S433). Then, the CPU 11 terminates the remote input provision process and returns to the access acceptability determination process (see FIG. 17).

When determining, based on the received authentication information, that the user is not authorized to use the remote input function (S403: No), or when determining that the "No" button 562 has been operated on the panel usage permission screen 56 (S405: No), the CPU 11 sends, to the requesting device, web page data representing a screen for providing a notification that remote control is not possible (S431). Thereby, the screen to provide the notification that remote control is not possible is displayed on the requesting device, and the remote input function does not begin to be provided. After S431, the CPU 11 deletes the information indicating that the remote input function is being provided (S433), terminates the remote input provision process, and returns to the access acceptability determination process shown in FIG. 17.

When determining in S405 that the "No" button 562 has been operated, for instance, the MFP 101 does not display the panel usage permission screen 56 for a particular time (e.g., one minute). When having received again a request for the remote input function during this particular time, the MFP 101 sends, to the requesting device, web page data representing a screen to provide a notification that remote control is not possible, in substantially the same manner as when the "No" button 562 has been operated in S405.

The remote input function is a function based on an assumption that a remote operator may cooperate with a user in front of the MFP 101 (e.g., a remote administrator may teach the user in front of the MFP 101 how to operate the MFP 101). By waiting for an input operation to the panel usage permission screen 56, it is possible to prevent the MFP 101 from being remotely operated, for instance, in a state where there is no user with whom the remote operator (e.g., the remote administrator) is to cooperate. On the other hand, when remote control using the remote input function is started, the display on the touch panel 131 is automatically changed by remote operation. Hence, for instance, when there is a user who is about to use the MFP 101 regardless of the remote input function, once the remote input function begins to be provided, the user is unable to use the MFP 101 until the provision of the remote input function is terminated. The user who is about to use the MFP 101 may suspend the start of remote control by operating the "No" button 562 on the displayed panel usage permission screen 56.

On the other hand, when determining that the remote input function is being provided at the start of the remote input provision process (S400: Yes), the CPU 11 sends provision-in-progress screen data to the requesting device (S441). Thereafter, the CPU 11 terminates the remote input provision process. The process in S441 is substantially the same process as in B21 of FIG. 7. The provision-in-progress screen data is, for instance, screen data for causing the requesting device to display a screen such as the provision-in-progress screen 52 shown in FIG. 8.

The MFP 101 of the second illustrative embodiment is configured to provide any of the mobile input function and the remote input function to the requesting device. The MFP 101 is further configured to accept a parameter setting instruction and an instruction to perform image formation from the requesting device through any of the mobile input function and the remote input function. However, the mobile input function and the remote input function are assumed to be used by respective different types of users. Therefore, respective conditions for providing the mobile input function and the remote input function are different from each other.

The mobile input function is assumed to be used by a user who is in front of the MFP 101. In the mobile input function, the access information is displayed on the operation panel 13, thereby enabling the user to easily access the MFP 101. On the other hand, immoderate accesses and remote operations are restricted by dynamic changes of the access information using the key and by limiting the acceptable accesses to accesses via the WFD 24. The remote input function is assumed to be used by remote administrators. In the remote input function, the communication paths through which the MFP 101 is allowed to receive the request for the remote input function are not limited. However, the access information is not displayed on the touch panel 131. Moreover, successful user authentication is included in requirements to start providing the remote input function. Thereby, the use of the remote input function by users other than the administrators is restricted. Thus, the MFP 101 may provide each of the mobile input function and the remote input function according to an intended use.

As described in detail above, the MFP 101 of the second illustrative embodiment supports the two input functions (i.e., the mobile input function and the remote input function) that operate in respective different manners. Thus, the MFP 101 may provide a preferable one of the mobile input function and the remote input function according to an intended use.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

For instance, aspects of the present disclosure may be applied to printers, image scanners, copiers, or fax machines, instead of the MFP 1 and the MFP 101.

All the screens illustrated in relevant drawings are just examples. The screens are not limited to the illustrated examples with respect to display modes thereof. For instance, the wordings of the messages, and the shapes and arrangement of the buttons, as displayed on the screens, are not limited to the examples illustrated in relevant drawings. For instance, the two-dimensional code image 511 may be displayed on a part of the home screen 53, instead of being displayed on the entire screen area of the touch panel 131 as on the standby screen 51 shown in FIG. 4 and on the standby screen 55 shown in FIG. 16. The access information included in the standby screens 51 and 55 may not necessarily be displayed as the two-dimensional code image 511, but may be displayed as text information or a barcode image.

The screen displayed on the mobile terminal 2 when the mobile input function begins to be provided is not limited to the home screen 62 shown in FIG. 9. For instance, the screen displayed on the mobile terminal 2 when the mobile input function begins to be provided may not include some of the hardware keys 132, or may include one or more buttons other than the close button 623 that are not included in the operation panel 13. The panel screen 621 and the key screen 622 may not be perfect reproduction of the home screen 53 and the hardware keys 132 of the operation panel 13 with respect to the layout and the size thereof. The screens to be displayed on the mobile terminal 2 by the mobile input function may be any screens configured to accept user operations, and are not limited to screens configured in imitation of the operation screens displayed on the touch panel 131 of the MFP 1 but may be original screens.

In the aforementioned illustrative embodiments, the mobile terminal 2 causes the browser 213 to display a screen based on the received screen data. However, the program for displaying the screen based on the received screen data is not limited to the browser 213 but may be a dedicated application program. Nonetheless, when the mobile terminal 2 causes the browser 213 to display the screen based on the received screen data, there is no need to install the dedicated application program, and it is possible to more easily use the mobile input P 22 and the remote input function.

In the aforementioned first illustrative embodiment, the mobile terminal 2 is assumed to be a smartphone or a tablet computer having a camera. However, the mobile terminal 2 is not limited to the above examples. For instance, the mobile terminal 2 may be a laptop computer or a terminal without a camera. When using a terminal without a camera, for instance, the user may access the MFP 1 from the terminal without a camera by capturing the two-dimensional code image 511 with a camera of a separate device and sending the captured data to the terminal.

The MFP 1 of the aforementioned first illustrative embodiment may further have substantially the same function as the remote input function of the MFP 101 of the aforementioned second illustrative embodiment. In other words, the MFP 1 may be configured to perform the remote input provision process shown in FIG. 18. The MFP 1 of the first illustrative embodiment may further have substantially the same WFD as the WFD 24 of the MFP 101 of the second illustrative embodiment, and may provide the mobile input function only when the MFP 1 has received access via the WFD. In other words, the MFP 1 may be configured to perform the access acceptability determination process shown in FIG. 17.

In the aforementioned first and second illustrative embodiments, the MFP 1 and MFP 101 dynamically generate a key and display the access information including the URL and the key. However, the access information may not include the key. Nonetheless, when the access information includes the dynamically generated key, the MFP 1 and MFP 101 are configured to not accept access using old access information, thereby ensuring higher security for the mobile input function.

In the aforementioned first illustrative embodiment, the MFP 1 display the standby screen 51 (see FIG. 4) that includes the "Exit" button 512. Further, in the aforementioned second illustrative embodiment, the MFP 101 display the standby screen 55 (see FIG. 16) that includes the "Exit" button 512. However, the MFP 1 and/or the MFP 101 may display a standby screen that does not include the "Exit" button 512. In that case, for instance, the MFP 1 and/or the MFP 101 may be configured to accept an operation to one of the hardware keys 132 in place of an operation to the "Exit" button 512.

In the aforementioned first illustrative embodiment, when having accepted an operation to the "Exit" button 512, the MFP 1 automatically displays the standby screen 51 (see FIG. 4) again after a lapse of, for instance, one minute with no operation accepted since the acceptance of the operation to the "Exit" button 512. Likewise, in the aforementioned second illustrative embodiment, when having accepted an operation to the "Exit" button 512, the MFP 101 automatically displays the standby screen 51 (see FIG. 16) again after a lapse of, for instance, one minute with no operation accepted since the acceptance of the operation to the "Exit" button 512. In another instance, however, the standby screens 51 and 55 may not be displayed until a new operation such as an operation to the back key 133 is accepted.

In the aforementioned first illustrative embodiment, the MFP 1 is configured to accept only either an access from the mobile terminal 2 or an operation to the "Exit" button 512 while the standby screen 51 (see FIG. 4) is being displayed. Likewise, in the aforementioned second illustrative embodiment, the MFP 101 is configured to accept only either an access from the mobile terminal 2 or an operation to the "Exit" button 512 while the standby screen 55 (see FIG. 16) is being displayed. However, the MFP 1 or the MFP 101 may be configured to accept other operations (e.g., a long press operation to the back key 133) while the standby screen 51 or the standby screen 55 is being displayed. In that case, when having accepted a long press operation to the back key 133, unlike when an operation to the "Exit" button 512 is accepted, the MFP 1 or the MFP 101 may immediately generate a new key and display the standby screen 51 or 55, instead of displaying an operation screen and waiting for one minute. Namely, the MFP 1 or the MFP 101 may not display an operation screen when having accepted a long press operation to the back key 133 while the standby screen 51 or 55 is being displayed. In another instance, when having accepted a long press operation to the back key 133 while the standby screen 51 or 55 is being displayed, the MFP 1 or the MFP 101 may display an operation screen for a shorter time than when an operation to the "Exit" button 512 is accepted.

In the start procedure (see FIG. 7) of the aforementioned first and second illustrative embodiments, when having received the start information from the mobile terminal 2, the MFP 1 and the MFP 101 store the information indicating that the mobile input function is being provided (B11) and determine whether the mobile input function is being provided based on that information (B01). However, the timing for determining whether the mobile input function is being provided is not limited to this. For instance, when having sent the start screen data in A21 of FIG. 5, the MFP 1 may store information indicating that the start screen data has been sent. In this case, when the information indicating that the start screen data has been sent is stored, the MFP 1 may not send the start screen data even if there is an access to the mobile input function. Substantially the same may apply to the MFP 101.

Figure 10A:
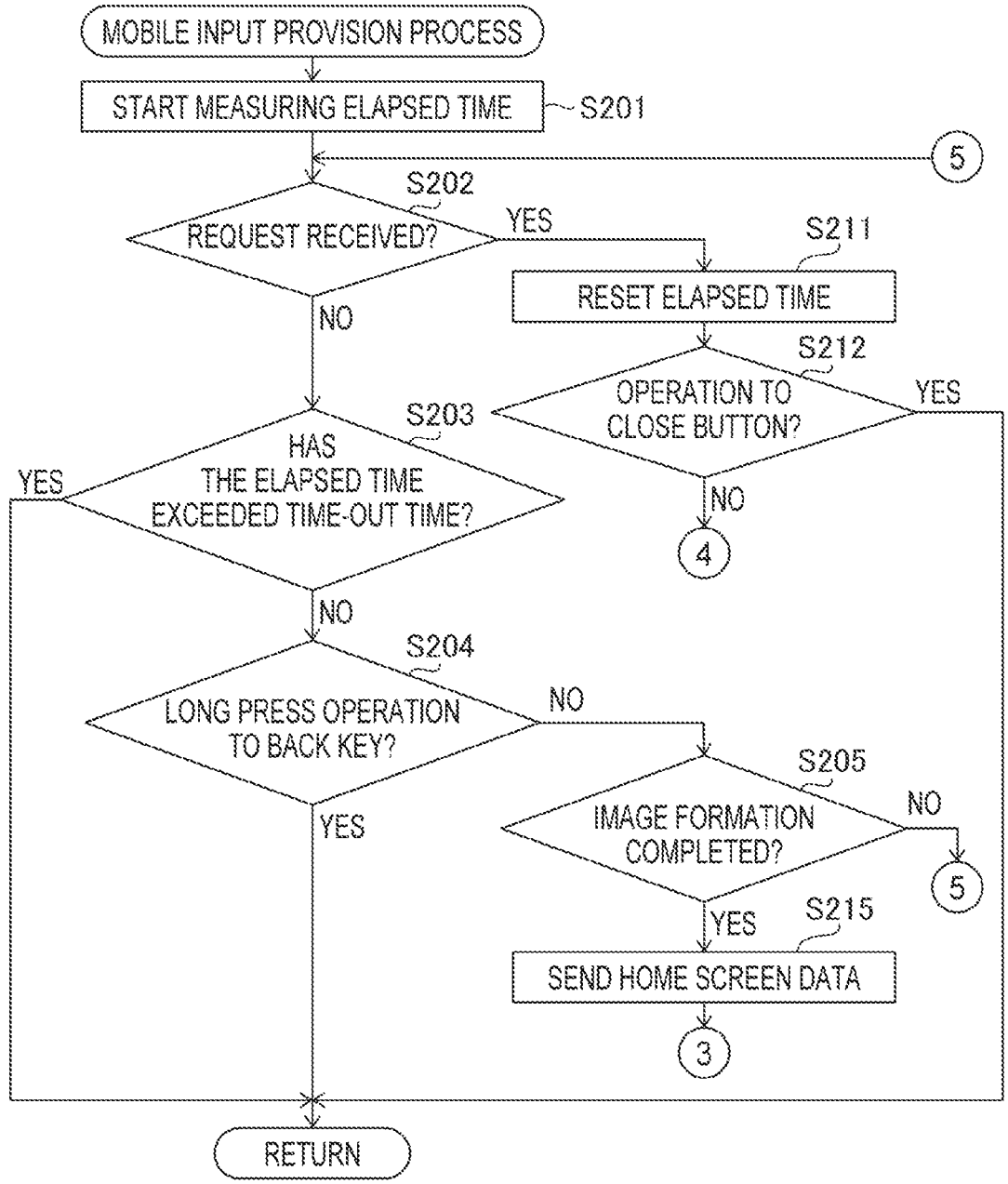
FIGS. 10A and 10B are flowcharts showing a procedure of a mobile input provision process.
Figure 10B:
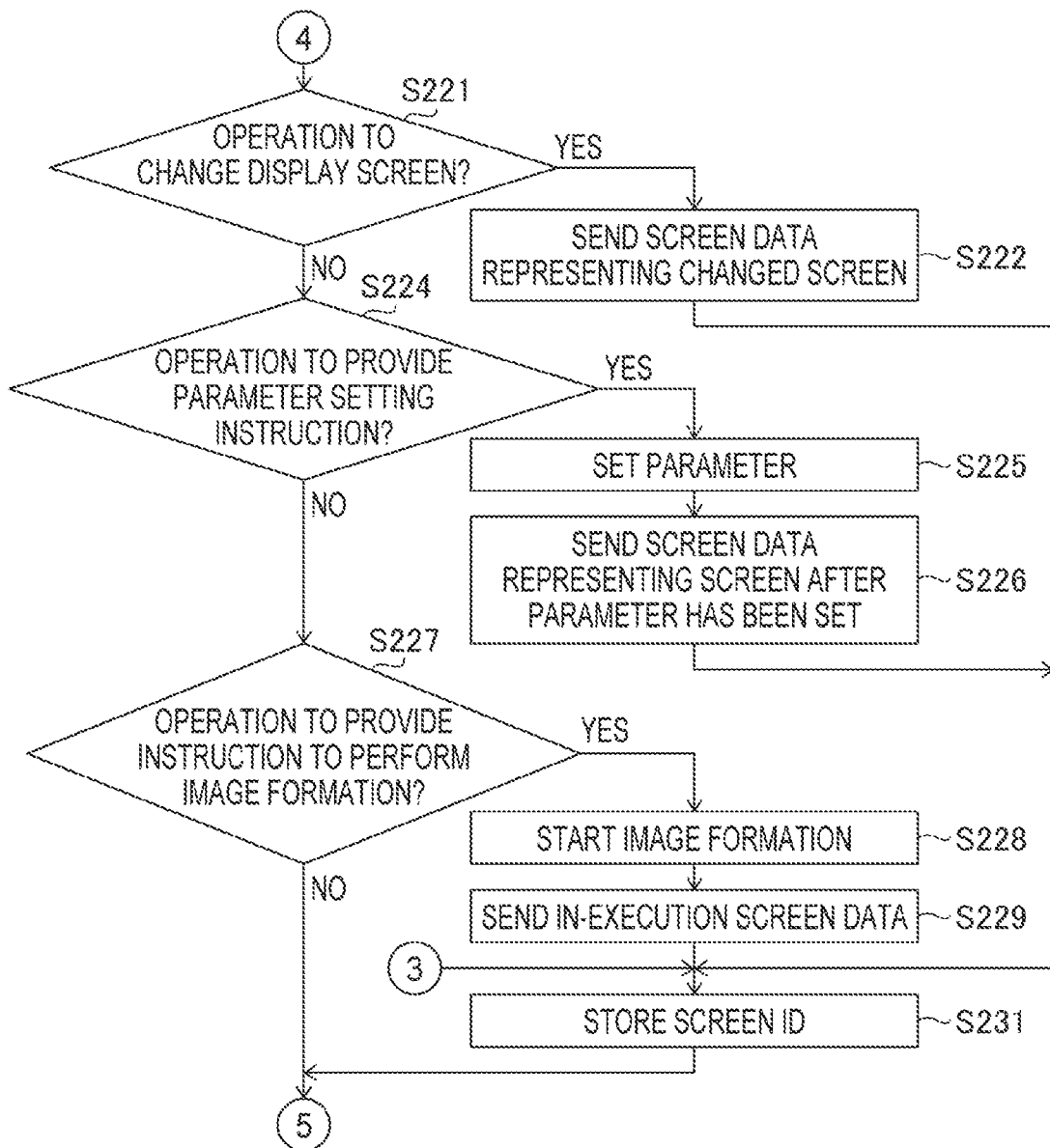
Figure 11:
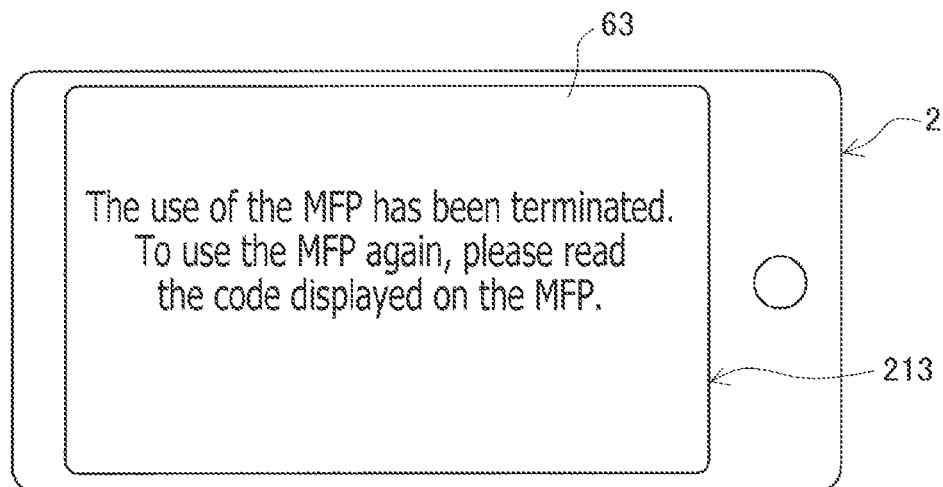
FIG. 11 shows an example of a termination screen.

In the aforementioned first and second illustrative embodiments, the MFP 1 and the MFP 101 measure the elapsed time during which there is no operation data received during the provision of the mobile input function, and determine whether the elapsed time has exceeded the particular time-out time (S203 in FIG. 10A). However, the time-out determination may be made by the mobile terminal 2. For instance, the mobile terminal 2 may send operation data indicating that the use of the mobile input function has been terminated, when a time during which there is no operation accepted after receipt of screen data has exceeded a time-out time.

In the aforementioned first and second illustrative embodiments, when having received a long press operation to the back key 133 (S204: Yes in FIG. 10A) while the mobile input function is being provided, the MFP 1 and the MFP 101 forcibly terminate the provision of the mobile input function. However, acceptable operations for terminating the provision of the mobile input function are not limited to a long press operation to the back key 133*d*, but may also include long press operations on other hardware keys. In addition, the modes of input operations to the hardware keys during the provision of the mobile input function may be discriminated. For instance, the discriminable modes of input operations to the hardware keys may include, in addition to a long press operation, a normal input operation, a plurality of consecutive operations, and a simultaneous press operation of simultaneously pressing a plurality of hardware keys. The MFP 1 may perform different processes for individual different modes of input operations. Substantially the same may apply to the MFP 101.

In the aforementioned first and second illustrative embodiments, after terminating the provision of mobile input function, the MFP 1 and the MFP 101 display the screen based on the stored screen ID on the touch panel 131 of the operation panel 13 (B19 in FIG. 7). However, the MFP 1 may not display the screen based on the stored screen ID. In this case, the MFP 1 may display a new standby screen 51 immediately after the mobile input provision process (see FIGS. 10A and 10B) is terminated. Further, even while image formation is in execution when the mobile input provision process has been terminated, the MFP 1 may display, for instance, the home screen 53 (see FIG. 3) instead of displaying the in-execution screen 54 (see FIG. 12). Substantially the same may apply to the MFP 101.

In the aforementioned second illustrative embodiment, the MFP 101 performs user authentication only when there is a request to provide the remote input function. However, the MFP 101 may not perform user authentication. Moreover, for instance, the MFP 101 may accept user login even when there is a request to provide the mobile input function. Substantially the same may apply to the MFP 1. For instance, the home screen 62 may include a button to accept user login. In this case, the MFP 1 or the MFP 101 may transmit login screen data in response to receiving operation data indicating an operation to the button. The user authentication during the provision of the mobile input function may be used, for instance, to select a file to be printed in storage printing.

The remote input function is assumed to be used by the administrator of the MFP 101. For instance, the remote input function may be adapted to accept only remote operations to the MFP 101 but also accept various operations related to the MFP 101. Moreover, in the aforementioned second illustrative embodiment, the MFP 101 accept an instruction to start providing the remote input function regardless of the communication path. However, the MFP 101 may not accept the instruction to start providing the remote input function through the communication path via the WFD 24. The WFD 24 may be enabled to perform one-to-many communication.

In the aforementioned second illustrative embodiment, when the MFP 101 has received neither an operation to the "Yes" button 561 nor the "No" button 562 even after a lapse of the particular time since displaying the panel usage permission screen 56 in S404 of the remote input provision process (see FIG. 18), the MFP 101 may proceed to S411 based on an assumption that an operation to the "Yes" button has been accepted. Moreover, in the aforementioned second illustrative embodiment, when the MFP 101 has started providing the remote input function, the MFP 101 changes the display on the touch panel 1311 according to the received operation data. However, the MFP 101 may not change the display on the touch panel 1311 according to the received operation data. For instance, the MFP 101 may display on the touch panel 131 a screen indicating that the remote input function is being provided.

In the aforementioned second illustrative embodiment, the MFP 101 does not accept an operation to the touch panel 131 during the provision of the remote input function. However, the MFP 101 may accept an operation to the touch panel 131 during the provision of the remote input function. In another instance, the MFP 101 may be configured to selectively set whether to accept an operation to the touch panel 131 during the provision of the remote input function, when the MFP 101 starts providing the remote input function. In this case, when the MFP 101 set to accept an operation to the touch panel 131 during the provision of the remote input function, the MFP 101 may cause the requesting device to perform polling, thereby sending, to the requesting device, screen data of the screen that has been changed based on the user operation. In that case, the MFP 101 may perform various operations corresponding to S106 in FIG. 2A, based on the accepted operation. Moreover, since the mobile input function is invalid when the remote input function is valid, the MFP 101 may display the home screen 53 instead of the standby screen in response to accepting a user operation to display the home screen 53.

In any flowchart disclosed in the aforementioned illustrative embodiments, a plurality of processes in any plurality of steps may be arbitrarily changed in their order of execution or may be performed in parallel to the extent that there is no inconsistency in the processing contents and results.

The processes disclosed in the aforementioned illustrative embodiments may be performed by one or more CPUs, one or more hardware elements such as ASICs, or a combination of at least two thereof. The processes disclosed in the aforementioned illustrative embodiments may be realized in various aspects such as a non-transitory computer-readable storage medium storing a computer-readable program for performing the processes, or a method for performing the processes.

The following shows examples of associations between elements illustrated in the aforementioned illustrative embodiment(s) and modification(s), and elements claimed according to aspects of the present disclosure. For instance, the MFP 1 may be an example of an "image forming apparatus" according to aspects of the present disclosure. The controller 10 may be an example of a "controller" according to aspects of the present disclosure. The CPU 11 may be an example of a "processor" according to aspects of the present disclosure. The memory 12 may be an example of a "non-transitory computer-readable storage medium" according to aspects of the present disclosure. The CPU 11 and the memory 12 may be included in the "controller" according to aspects of the present disclosure. The network I/F 141 may be an example of a "network interface" according to aspects of the present disclosure. Examples of a "memory" connectable with the "image forming apparatus" according to aspects of the present disclosure may include, but are not limited to, the memory 12, the buffer of the CPU 11, the ROM, the RAM, and the HDD incorporated in the MFP 1, storage media readable and writable by the CPU 11, USB memories connectable with the MFP 1, external memories such as HDDs, and a memory and an HDD included in each device that is connected with the MFP 1 via the network I/F 14. The home screen 53 may be an example of a "local operation screen" according to aspects of the present disclosure. The home screen 62 may be an example of an "operation screen" according to aspects of the present disclosure. The "Exit" button 512 may be an example of a "particular operable object" according to aspects of the present disclosure. An operation to the "Exit" button 512 may be an example of a "first operation" according to aspects of the present disclosure. The back key 133 may be an example of a "particular hardware key" according to aspects of the present disclosure. A long press operation to the back key 133 may be an example of a "second operation" according to aspects of the present disclosure. The close button 623 may be an example of a "termination operable object" according to aspects of the present disclosure. An operation to the close button 623 may be an example of a "termination instruction" according to aspects of the present disclosure. Operation data indicating an operation to the close button 623 may be an example of "termination data" according to aspects of the present disclosure. The particular no-operation time may be an example of a "first threshold time" according to aspects of the present disclosure. The particular time-out time may be an example of a "second threshold time" according to aspects of the present disclosure.

What is claimed is:

1. An image forming apparatus comprising:
a network interface;
an operation panel including a touch panel, and
a controller configured to:
start providing a mobile input function of the image forming apparatus to a mobile terminal via the network interface in response to receiving access required to start providing the mobile input function from the mobile terminal via the network interface in a state where the mobile input function is not provided, the mobile input function enabling the image forming apparatus to accept operations from the mobile terminal via the network interface;
after starting to provide the mobile input function, send display data to the mobile terminal via the network interface, thereby causing the mobile terminal to display an operation screen for operating the image forming apparatus from the mobile terminal;
receive operation data from the mobile terminal via the network interface while the mobile input function is being provided, the operation data indicating what kind of operation has been accepted on the operation screen displayed on the mobile terminal;
perform a corresponding process depending on what kind of operation is indicated by the received operation data, wherein the controller sets a parameter when the received operation data indicates an operation related to setting of the parameter for image formation by the image forming apparatus, whereas the controller performs image formation when the received operation data indicates an operation related to execution of the image formation by the image forming apparatus;
cause the touch panel to display a local operation screen in the state where the mobile input function is not provided;
in response to accepting an operation to the local operation screen, perform a corresponding process depending on what kind of operation has been accepted on the local operation screen, wherein the controller sets a parameter when the accepted operation on the local operation screen is an operation related to setting of the parameter for image formation by the image forming apparatus, whereas the controller performs image formation when the accepted operation on the local operation screen is an operation related to execution of the image formation by the image forming apparatus;
in response to accepting a first operation to the operation panel with the local operation screen not displayed on the touch panel, cause the touch panel to display the local operation screen, and thereafter switch the local operation screen displayed on the touch panel to a standby screen for starting to provide the mobile input function, after waiting until a continuous time with no operation to the touch panel exceeds a first threshold time; and
cause the touch panel to display the standby screen regardless of the first threshold time, when one condition is satisfied among a plurality of conditions consisting of:
a first condition that the controller has accepted a second operation to the operation panel with the local operation screen not displayed on the touch panel;
a second condition that in response to receiving, while the mobile input function is being provided, termination data indicating that the mobile terminal has terminated use of the mobile input function, from the mobile terminal, the controller has terminated providing the mobile input function; and
a third condition that in response to a continuous time with no operation data received from the mobile terminal having exceeded a second threshold time while the mobile input function is being provided, the controller has terminated providing the mobile input function.

2. The image forming apparatus according to claim 1, wherein the controller is further configured to, in response to accepting the second operation to the operation panel with the local operation screen not displayed on the touch panel, cause the touch panel to display the standby screen without waiting for the first threshold time to elapse after the acceptance of the second operation.

3. The image forming apparatus according to claim 2, wherein the controller is further configured to:
accept the first operation when the standby screen is displayed on the touch panel in the state where the mobile input function is not provided;
in response to accepting the first operation to the operation panel with the local operation screen not displayed on the touch panel, cause the touch panel to display the local operation screen, and thereafter switch the local operation screen displayed on the touch panel to the standby screen after waiting until the continuous time with no operation to the touch panel exceeds the first threshold time;
accept the second operation while the mobile input function is being provided; and
in response to accepting the second operation to the operation panel with the local operation screen not displayed on the touch panel, terminate providing the mobile input function, and cause the touch panel to display the standby screen without waiting for the first threshold time to elapse after the acceptance of the second operation.

4. The image forming apparatus according to claim 2, wherein the operation panel includes the touch panel and a particular hardware key,
wherein the second operation is an operation to the particular hardware key, and
wherein the controller is further configured to:
while the mobile input function is being provided, accept the operation to the particular hardware key, and not accept any operation to the operation panel except for the operation to the particular hardware key; and
terminate providing the mobile input function in response to accepting the operation to the particular hardware key of the operation panel with the local operation screen not displayed on the touch panel, and cause the touch panel to display the standby screen without waiting for the first threshold time to elapse after the acceptance of the operation to the particular hardware key.

5. The image forming apparatus according to claim 2, wherein the controller is further configured to:
accept the second operation while the mobile input function is being provided; and
in response to accepting the second operation to the operation panel with the local operation screen not displayed on the touch panel, terminate providing the mobile input function, and cause the touch panel to display the local operation screen in advance of displaying the standby screen on the touch panel; and
cause the touch panel to display the standby screen when a particular display time, shorter than the first threshold time, has elapsed since the local operation screen began to be displayed in response to the acceptance of the second operation.

6. The image forming apparatus according to claim 2, wherein the controller is further configured to:
accept the second operation while the mobile input function is being provided; and
in response to accepting the second operation to the operation panel with the local operation screen not displayed on the touch panel, perform:
terminating providing the mobile input function;
when having a job that is in execution according to an execution instruction from the mobile terminal, causing the touch panel to display an in-execution screen in advance of displaying the standby screen on the touch panel;
when a predetermined display time, shorter than the first threshold time, has elapsed since the in-execution screen began to be displayed, causing the touch panel to display the standby screen; and
when having no job that is in execution according to an execution instruction from the mobile terminal, causing the touch panel to display the standby screen without waiting for the first threshold time to elapse after the acceptance of the second operation, without displaying the in-execution screen.

7. The image forming apparatus according to claim 1, wherein the controller is further configured to, in response to receiving the termination data while the mobile input function is being provided, terminate providing the mobile input function, and cause the touch panel to display the standby screen without waiting for the first threshold time to elapse after receiving the termination data.

8. The image forming apparatus according to claim 7, wherein the controller is further configured to:
accept the first operation to the operation panel with the standby screen displayed on the touch panel in the state where the mobile input function is not provided; and
in response to accepting the first operation to the operation panel with the local operation screen not displayed, cause the touch panel to display the local operation screen, and thereafter switch the local operation screen displayed on the touch panel to the standby screen after waiting until the continuous time with no operation to the touch panel exceeds the first threshold time.

9. The image forming apparatus according to claim 7, wherein the controller is further configured to:
after starting to provide the mobile input function, send the display data to the mobile terminal via the network interface, thereby causing the mobile terminal to display the operation screen, and a termination operable object for accepting a termination instruction to terminate providing the mobile input function; and
in response to receiving, as the termination data, the operation data indicating an operation to the termination operable object as the termination data from the mobile terminal while the mobile input function is being provided, terminate providing the mobile input function, and cause the touch panel to display the standby screen without waiting for the first threshold time to elapse after receiving the termination data.

10. The image forming apparatus according to claim 7, wherein the controller is further configured to:
in response to receiving the termination data from the mobile terminal while the mobile input function is being provided, terminate providing the mobile input function, and cause the touch panel to display the local operation screen in advance of displaying the standby screen on the touch panel; and
cause the touch panel to display the standby screen when a particular display time, shorter than the first threshold time, has elapsed since receiving the termination data.

11. The image forming apparatus according to claim 7, wherein the controller is further configured to, in response to receiving the termination data from the mobile terminal while the mobile input function is being provided, perform:
terminating providing the mobile input function;
when having a job that is in execution according to an execution instruction from the mobile terminal, causing the touch panel to display an in-execution screen in advance of displaying the standby screen on the touch panel;
when a predetermined display time, shorter than the first threshold time, has elapsed since receiving the termination data, causing the touch panel to display the standby screen; and
when having no job that is in execution according to an execution instruction from the mobile terminal, causing the touch panel to display the standby screen without waiting for the first threshold time to elapse after receiving the termination data, without displaying the in-execution screen.

12. The image forming apparatus according to claim 1, wherein the controller is further configured to, in response to the continuous time with no operation data received from the mobile terminal having exceeded the second threshold time while the mobile input function is being provided, terminate providing the mobile input function, and cause the touch panel to display the standby screen.

13. The image forming apparatus according to claim 12, wherein the controller is further configured to:
   accept the first operation to the operation panel with the standby screen displayed on the touch panel when the mobile input function is not provided; and
   in response to accepting the first operation to the operation panel with the local operation screen not displayed on the touch panel, cause the touch panel to display the local operation screen, and thereafter switch the local operation screen displayed on the touch panel to the standby screen after waiting until the continuous time with no operation to the touch panel exceeds the first threshold time.

14. The image forming apparatus according to claim 1, wherein the standby screen includes access information required to start providing the mobile input function, and
wherein the controller is further configured to start providing the mobile input function in response to receiving the access using the access information from the mobile terminal via the network interface.

15. The image forming apparatus according to claim 1, wherein the controller is further configured to:
   after starting to provide the mobile input function, send the display data to the mobile terminal via the network interface, thereby causing the mobile terminal to display the operation screen for operating the image forming apparatus from the mobile terminal, the operation screen virtually showing the operation panel with the local operation screen displayed on the touch panel; and
   in response to receiving, from the mobile terminal that has received the display data, the operation data via the network interface while the mobile input function is being provided, send new display data to the mobile terminal via the network interface, the new display data causing the mobile terminal to display the operation screen virtually showing the operation panel updated based on an operation indicated by the received operation data.

16. The image forming apparatus according to claim 1, wherein the controller is further configured to:
   start providing the mobile input function, in response to receiving the access using a URL required to start providing the mobile terminal, from a browser incorporated in the mobile terminal via the network interface; and
   after starting to provide the mobile input function, send, as the display data, web page data to the mobile terminal via the network interface, thereby causing the browser incorporated in the mobile terminal to display a web page including the operation screen for operating the image forming apparatus from the mobile terminal.

17. The image forming apparatus according to claim 1, wherein the standby screen includes a particular operable object, and the first operation is an operation to the particular operable object, and
wherein the controller is further configured to, in response to accepting the operation to the particular operable object on the standby screen when the local operation screen is not displayed on the touch panel, and the standby screen is displayed on the touch panel, cause the touch panel to display the local operation screen, and thereafter switch the local operation screen displayed on the touch panel to the standby screen after waiting until the continuous time with no operation to the operation panel exceeds the first threshold time.

18. The image forming apparatus according to claim 17, wherein the controller is further configured to, when the standby screen is displayed on the touch panel, accept the operation to the particular operable object, and not accept any operations to the operation panel other than the operation to the particular operable object.

19. The image forming apparatus according to claim 1, wherein the controller comprises:
   a processor; and
   a non-transitory computer-readable storage medium storing computer-readable instructions that, when executed by the processor, cause the controller to:
      start providing the mobile input function of the image forming apparatus to the mobile terminal via the network interface in response to receiving access required to start providing the mobile input function from the mobile terminal via the network interface in the state where the mobile input function is not provided;
      after starting to provide the mobile input function, send the display data to the mobile terminal via the network interface, thereby causing the mobile terminal to display the operation screen for operating the image forming apparatus from the mobile terminal;
      receive the operation data from the mobile terminal via the network interface while the mobile input function is being provided;
      perform the corresponding process depending on what kind of operation is indicated by the received operation data, wherein the controller sets a parameter when the received operation data indicates an operation related to setting of the parameter for image formation by the image forming apparatus, whereas the controller performs image formation when the received operation data indicates an operation related to execution of the image formation by the image forming apparatus;
      cause the touch panel to display the local operation screen in the state where the mobile input function is not provided;
      in response to accepting an operation to the local operation screen, perform the corresponding process depending on what kind of operation has been performed on the local operation screen, wherein the controller sets a parameter when the accepted operation is an operation related to setting of the parameter for image formation by the image forming apparatus, whereas the controller performs image formation when the accepted operation is an operation related to execution of the image formation by the image forming apparatus;

in response to accepting the first operation to the operation panel with the local operation screen not displayed on the touch panel, cause the touch panel to display the local operation screen, and thereafter switch the local operation screen displayed on the touch panel to the standby screen after waiting until the continuous time with no operation to the touch panel exceeds the first threshold time; and cause the touch panel to display the standby screen regardless of the first threshold time, when one condition is satisfied among the plurality of conditions consisting of the first condition, the second condition, and the third condition.

20. A non-transitory computer-readable storage medium storing computer-readable instructions executable by a processor of an image forming apparatus comprising a network interface, and an operation panel including a touch panel, the instructions being configured to, when executed by the processor, cause the image forming apparatus to:

start providing a mobile input function of the image forming apparatus to a mobile terminal via the network interface in response to receiving access required to start providing the mobile input function from the mobile terminal via the network interface in a state where the mobile input function is not provided, the mobile input function enabling the image forming apparatus to accept operations from the mobile terminal via the network interface;

after starting to provide the mobile input function, send display data to the mobile terminal via the network interface, thereby causing the mobile terminal to display an operation screen for operating the image forming apparatus from the mobile terminal;

receive operation data from the mobile terminal via the network interface while the mobile input function is being provided, the operation data indicating what kind of operation has been performed on the operation screen displayed on the mobile terminal;

perform a corresponding process depending on what kind of operation is indicated by the received operation data, wherein the instructions, when executed by the processor, cause the image forming apparatus to set a parameter when the received operation data indicates an operation related to setting of the parameter for image formation by the image forming apparatus, whereas the instructions, when executed by the processor, cause the image forming apparatus to perform image formation when the received operation data indicates an operation related to execution of the image formation by the image forming apparatus;

cause the touch panel to display a local operation screen in the state where the mobile input function is not provided;

in response to accepting an operation to the local operation screen, perform a corresponding process depending on what kind of operation has been performed on the local operation screen, wherein the instructions, when executed by the processor, cause the image forming apparatus to set a parameter when the accepted operation is an operation related to setting of the parameter for image formation by the image forming apparatus, whereas the instructions, when executed by the processor, cause the image forming apparatus to perform image formation when the accepted operation is an operation related to execution of the image formation by the image forming apparatus;

in response to accepting a first operation to the operation panel with the local operation screen not displayed on the touch panel, cause the touch panel to display the local operation screen, and thereafter switch the local operation screen displayed on the touch panel to a standby screen for starting to provide the mobile input function, after waiting until a continuous time with no operation to the touch panel exceeds a first threshold time; and cause the touch panel to display the standby screen regardless of the first threshold time, when one condition is satisfied among a plurality of conditions consisting of:

a first condition of accepting a second operation to the operation panel with the local operation screen not displayed on the touch panel;

a second condition that in response to receiving, while the mobile input function is being provided, termination data indicating that the mobile terminal has terminated use of the mobile input function, from the mobile terminal, the controller has terminated providing the mobile input function; and a third condition that in response to a continuous time with no operation data received from the mobile terminal having exceeded a second threshold time while the mobile input function is being provided, the controller has terminated providing the mobile input function.

21. The non-transitory computer-readable storage medium according to claim 20,
wherein the instructions are further configured to, when executed by the processor, cause the image forming apparatus to, in response to accepting the second operation to the operation panel with the local operation screen not displayed on the touch panel, cause the touch panel to display the standby screen without waiting for the first threshold time to elapse after the acceptance of the second operation.

22. The non-transitory computer-readable storage medium according to claim 20,
wherein the instructions are further configured to, when executed by the processor, cause the image forming apparatus to, in response to receiving the termination data while the mobile input function is being provided, terminate providing the mobile input function, and cause the touch panel to display the standby screen without waiting for the first threshold time to elapse after receiving the termination data.

23. The non-transitory computer-readable storage medium according to claim 20,
wherein the instructions are further configured to, when executed by the processor, cause the image forming apparatus to, in response to the continuous time with no operation data received from the mobile terminal having exceeded the second threshold time while the mobile input function is being provided, terminate providing the mobile input function, and cause the touch panel to display the standby screen.

24. A method implementable on a controller of an image forming apparatus comprising a network interface, and an operation panel including a touch panel, the method comprising:

starting to provide a mobile input function of the image forming apparatus to a mobile terminal via the network interface in response to receiving access required to start providing the mobile input function from the mobile terminal via the network interface in a state where the mobile input function is not provided, the mobile input function enabling the image forming apparatus to accept operations from the mobile terminal via the network interface;

sending, after starting to provide the mobile input function, display data to the mobile terminal via the network interface, thereby causing the mobile terminal to display an operation screen for operating the image forming apparatus from the mobile terminal;

receiving operation data from the mobile terminal via the network interface while the mobile input function is being provided, the operation data indicating what kind of operation has been performed on the operation screen displayed on the mobile terminal;

performing a corresponding process depending on what kind of operation is indicated by the received operation data, wherein the corresponding process is setting a parameter when the received operation data indicates an operation related to setting of the parameter for image formation by the image forming apparatus, whereas the corresponding process is performing image formation when the received operation data indicates an operation related to execution of the image formation by the image forming apparatus;

causing the touch panel to display a local operation screen in the state where the mobile input function is not provided;

performing, in response to accepting an operation to the local operation screen, a corresponding process depending on what kind of operation has been performed on the local operation screen, wherein the corresponding process is setting a parameter when the accepted operation is an operation related to setting of the parameter for image formation by the image forming apparatus, whereas the corresponding process is performing image formation when the accepted operation is an operation related to execution of the image formation by the image forming apparatus;

causing, in response to accepting a first operation to the operation panel with the local operation screen not displayed on the touch panel, the touch panel to display the local operation screen, and thereafter switching the local operation screen displayed on the touch panel to a standby screen for starting to provide the mobile input function, after waiting until a continuous time with no operation to the touch panel exceeds a first threshold time; and causing the touch panel to display the standby screen regardless of the first threshold time, when one condition is satisfied among a plurality of conditions consisting of:
  a first condition that a second operation to the operation panel has been accepted when the local operation screen is not displayed on the touch panel;
  a second condition that in response to receiving termination data indicating that the mobile terminal has terminated use of the mobile input function from the mobile terminal while the mobile input function is being provided, providing the mobile input function has been terminated; and
  a third condition that in response to a continuous time with no operation data received from the mobile terminal having exceeded a second threshold time while the mobile input function is being provided, providing the mobile input function has been terminated.

25. The method according to claim 24, further comprising causing, in response to accepting the second operation to the operation panel with the local operation screen not displayed on the touch panel, the touch panel to display the standby screen without waiting for the first threshold time to elapse after the acceptance of the second operation.

26. The method according to claim 24, further comprising terminating, in response to receiving the termination data while the mobile input function is being provided, providing the mobile input function, and causing the touch panel to display the standby screen without waiting for the first threshold time to elapse after receiving the termination data.

27. The method according to claim 24, further comprising terminating, in response to the continuous time with no operation data received from the mobile terminal having exceeded the second threshold time while the mobile input function is being provided, providing the mobile input function, and causing the touch panel to display the standby screen.

* * * * *